United States Patent
Shukunami et al.

(10) Patent No.: US 9,065,570 B2
(45) Date of Patent: Jun. 23, 2015

(54) OPTICAL AMPLIFIER WITH FEEDBACK TO OBTAIN SET GAIN AND GAIN TILT

(75) Inventors: Norifumi Shukunami, Kawasaki (JP); Tatsuya Tsuzuki, Kawasaki (JP); Hiroki Ooi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 13/291,783

(22) Filed: Nov. 8, 2011

(65) Prior Publication Data
US 2012/0188631 A1 Jul. 26, 2012

(30) Foreign Application Priority Data
Jan. 26, 2011 (JP) .................. 2011-013660

(51) Int. Cl.
*H04B 10/17* (2006.01)
*H04B 10/294* (2013.01)
*H04B 10/12* (2006.01)

(52) U.S. Cl.
CPC ........ *H04B 10/2941* (2013.01); *H04B 10/2942* (2013.01)

(58) Field of Classification Search
CPC ................. H04B 10/2941; H04B 10/2942
USPC .............. 359/341.41, 337.1, 337.11
See application file for complete search history.

(56) References Cited

U.S. PATENT DOCUMENTS

| | | | |
|---|---|---|---|
| 6,034,812 A | 3/2000 | Naito | |
| 6,094,296 A * | 7/2000 | Kosaka | 359/341.41 |
| 6,097,862 A * | 8/2000 | Abramov et al. | 385/37 |
| 6,535,330 B1 * | 3/2003 | Lelic et al. | 359/337.13 |
| 6,556,345 B1 * | 4/2003 | Gassner et al. | 359/341.4 |
| 6,621,621 B1 * | 9/2003 | Jones et al. | 359/337.11 |
| 6,728,026 B2 * | 4/2004 | Lee et al. | 359/337.11 |
| 6,856,454 B2 * | 2/2005 | Pavel et al. | 359/337 |
| 6,952,309 B1 | 10/2005 | Tsuzaki | |
| 7,027,215 B2 | 4/2006 | Hatayama et al. | |
| 7,057,802 B2 * | 6/2006 | Kajiya et al. | 359/337.1 |
| 7,123,833 B2 * | 10/2006 | Szczepanek et al. | 398/33 |
| 7,251,410 B2 | 7/2007 | Ide | |
| 7,359,112 B2 | 4/2008 | Nishihara et al. | |
| 2002/0044343 A1 * | 4/2002 | Manzur | 359/337.11 |
| 2002/0071173 A1 * | 6/2002 | Lee et al. | 359/337.1 |
| 2002/0159135 A1 * | 10/2002 | Kelkar et al. | 359/337.1 |

(Continued)

FOREIGN PATENT DOCUMENTS

| | | |
|---|---|---|
| JP | 11-87812 A | 3/1999 |
| JP | 2001-103013 A | 4/2001 |

(Continued)

OTHER PUBLICATIONS

Japanese Office Action issued for Japanese Patent Application No. 2011-013660 mailed Apr. 8, 2014, with Partial English Translation, 6 pages.

(Continued)

*Primary Examiner* — Eric Bolda
(74) *Attorney, Agent, or Firm* — Fujitsu Patent Center

(57) ABSTRACT

In an optical amplification apparatus an optical amplifier amplifies an optical signal at set gain. An equalizer changes loss of the amplified optical signal according to wavelengths. A processor controls the equalizer so as to make the equalizer have a loss-wavelength characteristic corresponding to a gain tilt of the optical amplifier which occurs according to the set gain.

9 Claims, 26 Drawing Sheets

(56) References Cited

U.S. PATENT DOCUMENTS

2003/0053175 A1* 3/2003 Szczepanek et al. ......... 359/163
2004/0130773 A1* 7/2004 Malthe-Sorenssen
 et al. ............................ 359/290

FOREIGN PATENT DOCUMENTS

| JP | 2004-101935 A | 4/2004 |
| JP | 2004-103682 A | 4/2004 |
| JP | 2004-528751 A | 9/2004 |
| JP | 2006-58843 A | 3/2006 |
| JP | 2006-286918 A | 10/2006 |
| JP | 2006-295113 A | 10/2006 |
| WO | 01/05005 A1 | 1/2001 |
| WO | 02/071660 A2 | 9/2002 |
| WO | 2010/019885 A2 | 2/2010 |

OTHER PUBLICATIONS

JPOA—Office Action mailed Jan. 6, 2015 for corresponding Japanese Application No. 2011-013660, with English translation of relevant part: p. 1 line 12 to p. 2 line 20.

* cited by examiner

OPTICAL AMPLIFIER WITH FEEDBACK TO OBTAIN SET GAIN AND GAIN TILT

CROSS-REFERENCE TO RELATED APPLICATION

This application is based upon and claims the benefit of priority of the prior Japanese Patent Application No. 2011-013660, filed on Jan. 26, 2011, the entire contents of which are incorporated herein by reference.

FIELD

The embodiments discussed herein are related to an optical amplification apparatus for amplifying an optical signal.

BACKGROUND

EDFAs (Erbium-Doped Fiber Amplifiers) using an EDF (Erbium-Doped Fiber) are widely used as an optical amplification technique for WDM (Wavelength Division Multiplexing) transmission systems. An EDFA can amplify a band of 1530-1565 nm (C-Band) or a band of 1570-1605 nm (L-Band). An EDFA is characterized by a wide band. This characteristic is exploited and wavelengths are arranged in these bands at intervals of 0.4 nanometers. By doing so, WDM transmission systems which can transmit signals with eighty or more different wavelengths are put to practical use.

In an optical transmission system an optical amplifier is used for compensating for transmission loss. A signal light transmitted from a transmitter propagates along an optical fiber which is a transmission line, and is received by a receiver. A postamplifier placed at an output stage of a transmitter, a preamplifier placed at an input stage of a receiver, an in-line amplifier used in the case of multistage relay and the like are known as forms of optical amplifier placement.

For example, a variable gain optical amplifier is used as a WDM optical amplifier. With a variable gain optical amplifier control is exercised so that the gain of an EDF will be constant. By doing so, the gain-wavelength characteristic of the EDF does not change. Gain control is exercised by changing loss in a VOA (Variable Optical Amplifier) on the output side. With this variable gain optical amplifier output increases with an increase in the power of input to the EDF. Accordingly, a very strong excitation light is necessary.

Usually the gain of an EDF is not flat with respect to wavelengths. Therefore, a GEQ (Gain Equalizer) is used for equalizing the gain of an EDF. For example, a GEQ has a loss-wavelength characteristic which makes the output gain of an EDF flat with respect to wavelengths. GEQs using a dielectric multilayer film are widely used.

In the past, a long-cycle fiber grating by which the tilt of a transmission loss-wavelength waveform of an EDFA changes according to the tilt of a gain-wavelength waveform and by which the tilt of the above gain-wavelength waveform is arbitrarily controlled was proposed (see, for example, Japanese Laid-open Patent Publication No. 2004-103682).

Furthermore, an optical component, an optical amplifier module, and an optical transmission system which can compensate for a gain tilt to a higher degree was proposed (see, for example, Japanese Laid-open Patent Publication No. 2004-101935).

In addition, an optical amplifier control apparatus which has a simple structure and which speedily controls transient fluctuations in signal levels caused by SHB (Spectral Hole Burning) or SRS (Stimulated Raman Scattering) without deteriorating a noise characteristic was proposed. This optical amplifier control apparatus makes it possible to realize a multistage optical amplifier, and therefore realizes a long-distance transmission system including an optical add-drop multiplexer (see, for example, Japanese Laid-open Patent Publication No. 2006-295113).

However, a gain tilt of an EDF occurs according to set gain. A loss-wavelength characteristic of a GEQ is fixed. Accordingly, gain of the EDF is not flat with respect to wavelengths, depending on gain of the EDF set.

SUMMARY

According to an aspect of the invention, an optical amplification apparatus for amplifying an optical signal includes an optical amplifier which amplifies the optical signal at a set gain, an equalizer which changes loss of the amplified optical signal according to wavelengths, and a processor which controls the equalizer so as to make the equalizer have a loss-wavelength characteristic corresponding to a gain tilt of the optical amplifier that occurs according to the set gain.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
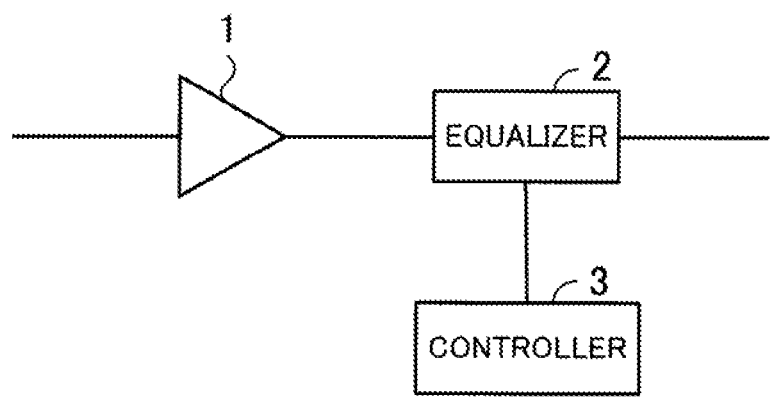
FIG. 1 illustrates an example of an optical amplification apparatus according to a first embodiment.

Embodiments will now be described in detail with reference to the accompanying drawings, wherein like reference numerals refer to like elements throughout.

FIG. 1 illustrates an example of an optical amplification apparatus according to a first embodiment. As illustrated in FIG. 1, an optical amplification apparatus includes an optical amplifier 1, an equalizer 2, and a controller 3.

An optical signal is inputted to the optical amplifier 1. The optical amplifier 1 amplifies the optical signal inputted at set gain. The optical amplifier 1 is, for example, an EDF.

The equalizer 2 changes loss of the optical signal amplified by the optical amplifier 1 according to wavelengths.

The controller 3 controls the equalizer 2 so as to make the equalizer 2 have a loss-wavelength characteristic corresponding to a gain tilt which the optical amplifier 1 has according to the set gain. For example, electric circuits in a processor are used as the controller 3.

If gain is not flat with respect to wavelengths, transmission degradation or the like occurs in an optical signal. Accordingly, usually an optical amplification apparatus exercises control so as to make gain of an EDF constant (so as to make the gain of an EDF fixed), and makes the gain flat with respect to wavelengths by the use of a GEQ having a fixed loss-wavelength characteristic. When set gain of an optical amplifier, such as an EDF, is changed, it has a gain tilt and its gain is not flat with respect to wavelengths. Therefore, with an optical amplification apparatus which exercises control so as to make gain of an EDF constant, gain of an optical amplifier set is fixed.

On the other hand, the controller 3 of the optical amplification apparatus illustrated in FIG. 1 controls the equalizer 2 so as to make the equalizer 2 have a loss-wavelength characteristic corresponding to a gain tilt which the optical amplifier 1 has according to the set gain. For example, a loss-wavelength characteristic of the equalizer 2 controlled by the controller 3 cancels a gain tilt of the optical amplifier 1 which occurs according to the set gain. In this case, for example, a gain tilt of the optical amplifier 1 which occurs as a result of a change in gain is canceled by the loss-wavelength characteristic of the equalizer 2. That is to say, the controller 3 controls the equalizer 2 so as to make a gain-wavelength characteristic of an optical signal flat according to the gain of the optical amplifier 1 set.

As has been described, the optical amplification apparatus includes the equalizer 2 which can change loss of an optical signal amplified by the optical amplifier 1 according to wavelengths. The equalizer 2 is controlled so that it will have a loss-wavelength characteristic corresponding to a gain tilt which the optical amplifier 1 has according to the gain set. As a result, the optical amplification apparatus can make its gain flat with respect to wavelengths according to gain of the optical amplifier 1 set.

A second embodiment will now be described in detail with reference to the drawings.

Figure 2:
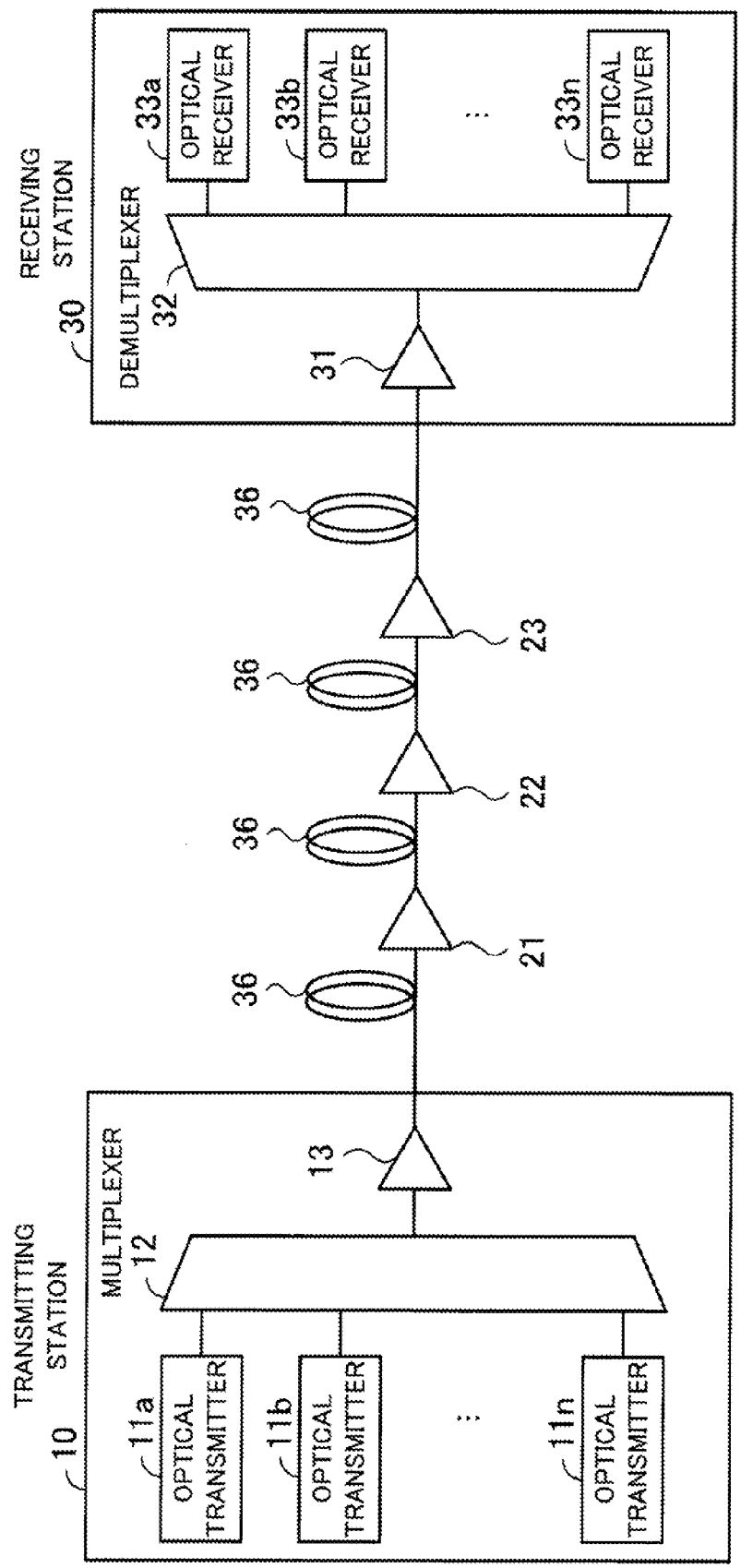
FIG. 2 illustrates an example of an optical transmission system to which an optical amplification apparatus according to a second embodiment is applied.

FIG. 2 illustrates an example of an optical transmission system to which an optical amplification apparatus according to a second embodiment is applied. As illustrated in FIG. 2, an optical transmission system is, for example, a WDM optical transmission system and includes a transmitting station 10, in-line amplifiers 21 through 23, a receiving station 30, and a transmission line 36. The transmitting station 10, the in-line amplifiers 21 through 23, and the receiving station 30 are optically coupled via the transmission line 36 which is, for example, an optical fiber.

The transmitting station 10 includes optical transmitters 11a through 11n, a multiplexer 12, and a postamplifier 13. The optical transmitters 11a through 11n output optical signals with different wavelengths.

The multiplexer 12 combines the optical signals outputted from the optical transmitters 11a through 11n, and outputs a signal obtained to the postamplifier 13 as a WDM signal. The multiplexer 12 is, for example, an AWG (Arrayed Waveguide Grating).

The postamplifier 13 amplifies the signal light outputted from the multiplexer 12 and outputs it via the transmission line 36.

Each of the in-line amplifiers 21 through 23 amplifies the optical signal which attenuates in the transmission line 36. The reason for this is that if the optical power of the optical signal is too low, OSNR (Optical Signal to Noise Ratio) falls. Usually the in-line amplifiers 21 through 23 are placed on the transmission line 36 at intervals of about 10 to 100 kilometers to amplify the optical signal again to a determined level.

The receiving station 30 includes a preamplifier 31, a demultiplexer 32, and optical receivers 33a through 33n. The preamplifier 31 amplifies the optical signal received via the transmission line 36.

The demultiplexer 32 separates the WDM signal into optical signals with different wavelengths. The demultiplexer 32 is, for example, an AWG.

The optical receivers 33a through 33n receive the optical signals with the different wavelengths, respectively, into which the demultiplexer 32 separates the WDM signal, and reproduce, for example, the optical signals outputted from the optical transmitters 11a through 11n.

An optical transmission system like that illustrated in FIG. 2 in which relay is performed by the use of optical amplification apparatus without opto-electric conversion or electro-optic conversion is referred to as a linear relay system. A linear relay system is used as a long-distance large-capacity transmission system and is applied to, for example, an optical transmission system which can perform transmission over a distance of 1,000 kilometers or more.

Figure 3:
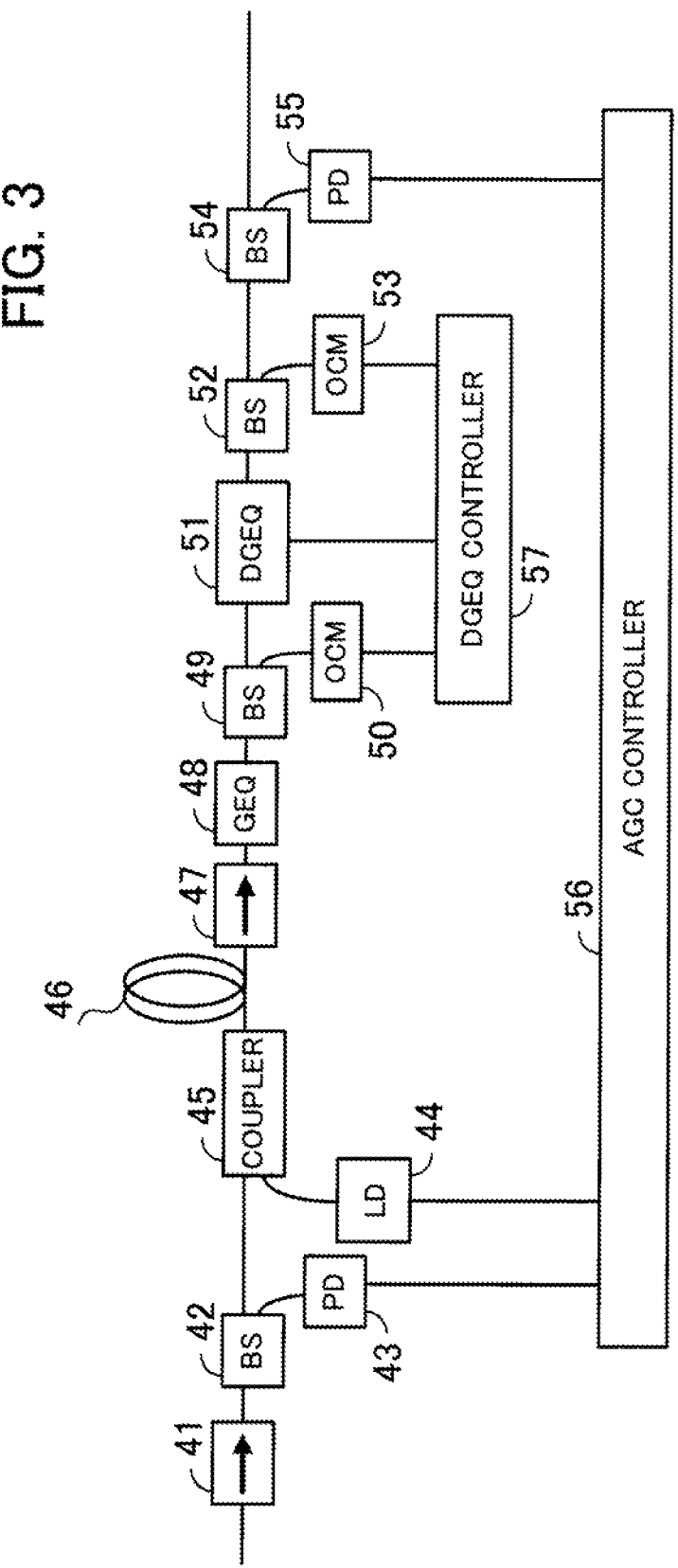
FIG. 3 illustrates an example of the structure of an optical amplification apparatus.

FIG. 3 illustrates an example of the structure of an optical amplification apparatus. As illustrated in FIG. 3, an optical amplification apparatus includes isolators 41 and 47, BSes (Beam Splitters) 42, 49, 52, and 54, PDs (PhotoDiodes) 43 and 55, an LD (Laser Diode) 44, a coupler 45, an EDF 46, a GEQ 48, OCMs (Optical Channel Monitors) 50 and 53, a DGEQ (Dynamic Gain Equalizer) 51, an AGC (Auto Gain Control) controller 56, and a DGEQ controller 57. The optical amplification apparatus illustrated in FIG. 3 corresponds to, for example, the postamplifier 13, the in-line amplifiers 21 through 23, and the preamplifier 31 illustrated in FIG. 2.

An optical signal to be amplified is inputted to the isolator 41. The isolator 41 prevents the optical signal from flowing back to the input side.

The BS 42 makes the optical signal outputted from the isolator 41 branch, and outputs it to the PD 43 and the coupler 45.

The PD 43 monitors optical power of the optical signal outputted from the BS 42. The monitored optical power is outputted to the AGC controller 56. For example, electric circuits in a processor are used as the AGC controller 56.

The LD 44 outputs an excitation light to the coupler 45 under the control of the AGC controller 56.

The coupler 45 combines the optical signal outputted from the BS 42 and the excitation light outputted from the LD 44. The coupler 45 is, for example, a WDM coupler.

The EDF 46 amplifies an optical signal outputted from the coupler 45. The EDF 46 amplifies an optical signal by the excitation light which is outputted from the LD 44 and which is combined with the optical signal outputted from the BS 42 by the coupler 45.

The isolator 47 prevents the optical signal from flowing back to the EDF 46 side.

The GEQ 48 equalizes optical signal gain. That is to say, the GEQ 48 makes output gain of the EDF 46 flat with respect to wavelengths. The GEQ 48 is made of, for example, a dielectric multilayer film and has a fixed loss-wavelength characteristic.

A gain-wavelength characteristic of the EDF 46, a loss-wavelength characteristic of the GEQ 48, and a gain tilt of the EDF 46 will now be described.

Figure 4:
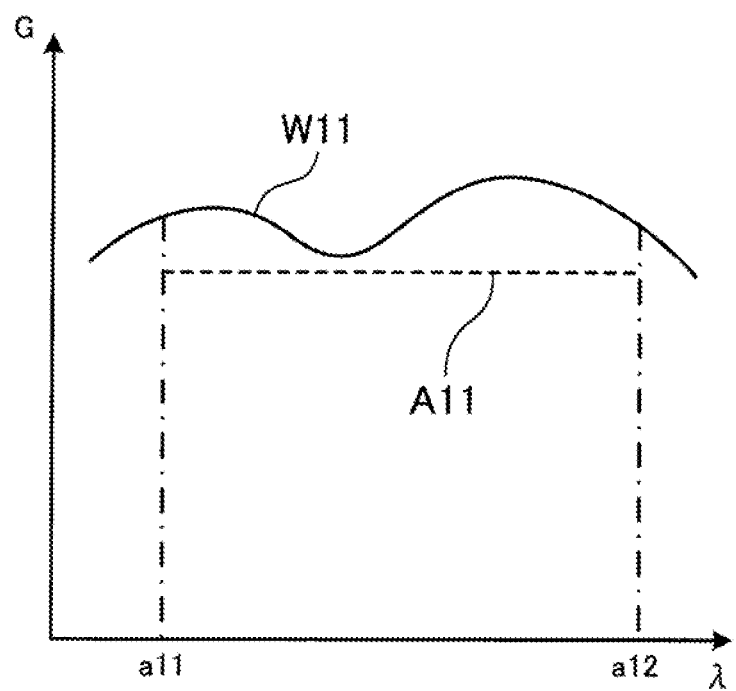
FIG. 4 is an example of the gain-wavelength characteristic of an EDF.

FIG. 4 is an example of the gain-wavelength characteristic of an EDF. In FIG. 4, a horizontal axis indicates a wavelength and a vertical axis indicates gain. A waveform W11 in FIG. 4 indicates the gain-wavelength characteristic of the EDF 46.

In FIG. 4, wavelengths a11 through a12 indicate a WDM signal band. In order to control degradation of a transmitted signal, the gain of the EDF 46 preferably is flat with respect to the wavelengths in the WDM signal band, as indicated by a dashed line A11 in FIG. 4.

Figure 5:
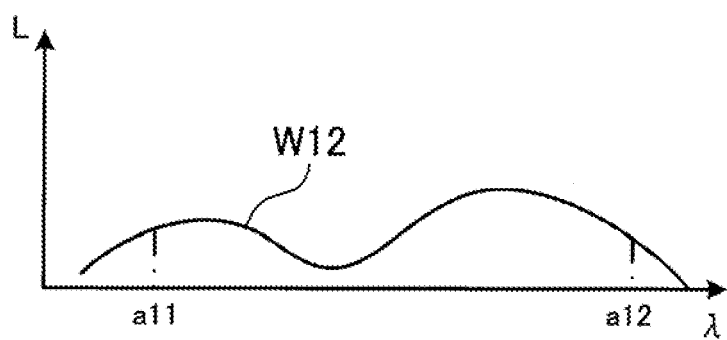
FIG. 5 is an example of the loss-wavelength characteristic of a GEQ.

FIG. 5 is an example of the loss-wavelength characteristic of a GEQ. In FIG. 5, a horizontal axis indicates a wavelength and a vertical axis indicates loss. A waveform W12 in FIG. 5 indicates the loss-wavelength characteristic of the GEQ 48.

In FIG. 5, wavelengths a11 through a12 indicate a WDM signal band. This is the same with FIG. 4. The waveform W12 which indicates the loss-wavelength characteristic and the waveform W11 indicated in FIG. 4 change in the same manner. That is to say, the waveform W12 indicates the characteristic reverse to that indicated by the waveform W11 in FIG. 4.

As indicated by the waveform W11 in FIG. 4, the gain of the EDF 46 is not flat with respect to the wavelengths. As indicated by the waveform W12 in FIG. 5, the loss-wavelength characteristic which the GEQ 48 has cancels the change in the waveform W11. Accordingly, as indicated by the dashed line A11 in FIG. 4, output gain of the GEQ 48 is flat with respect to the wavelengths.

Figure 6:
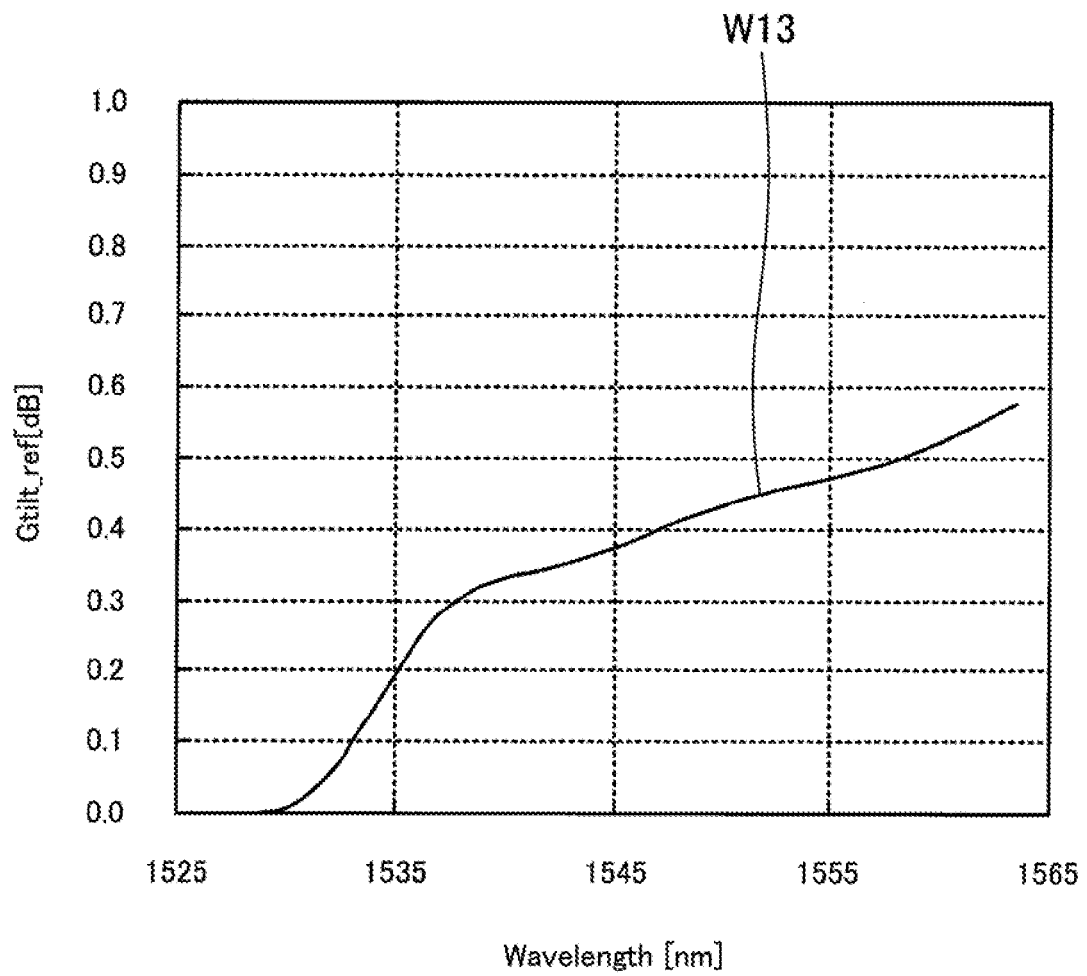
FIG. 6 is an example of a gain tilt of an EDF.

FIG. 6 is an example of a gain tilt of an EDF. In FIG. 6, a horizontal axis indicates a wavelength and a vertical axis indicates gain. A waveform W13 indicates a gain tilt which occurs at the time of reducing the gain of the EDF 46 by 1 dB.

That is to say, when the gain of the EDF 46 is reduced by 1 dB, a gain tilt increases with an increase in wavelength, as indicated by the waveform W13.

The waveform W13 can be expressed as $$y1 = Gtilt\_ref(\lambda) \qquad (1)$$

A wavelength is substituted for $\lambda$ in expression (1), and a gain tilt corresponding to the wavelength is found.

As stated above, the waveform W13 indicates a gain tilt which occurs at the time of reducing the gain of the EDF 46 by 1 dB. Therefore, a gain tilt which occurs at the time of reducing the gain of the EDF 46 is by n dB is found by multiplying the right side of expression (1) by n. For example, if the gain of the EDF 46 is reduced by n dB, a gain tilt of the EDF 46 is given by $$y2 = Gtilt\_ref(\lambda) \times n \qquad (2)$$

With the EDF 46 a change in gain causes a gain tilt in this way. As a result, output gain of the GEQ 48 is not flat with respect to wavelengths according to the gain of the EDF 46 set.

For example, it is assumed that the GEQ 48 has a loss-wavelength characteristic which makes its output gain flat with respect to wavelengths at determined gain of the EDF 46 set. If the gain of the EDF 46 is set to a value different from the determined gain, then output gain of the GEQ 48 is not flat with respect to wavelengths due to a gain tilt. Accordingly, the DGEQ controller 57 described later controls the DGEQ 51 so as to make output gain of the DGEQ 51 (gain of the optical amplification apparatus) flat according to the gain of the EDF 46 set. For example, electric circuits in a processor are used as the DGEQ controller 57.

FIG. 3 will be described again. The BS 49 makes the optical signal outputted from the GEQ 48 branch, and outputs it to the OCM 50 and the DGEQ 51.

The OCM 50 monitors optical power of the optical signal outputted from the BS 49 according to wavelengths. The monitored optical power is outputted to the DGEQ controller 57. With wavelengths where there is no signal, the OCM 50 may monitor, for example, an ASE (Amplified Spontaneous Emission) generated in the EDF 46.

The DGEQ 51 can change loss of the optical signal according to wavelengths under the control of the DGEQ controller 57. The DGEQ 51 will be described later in detail.

The BS 52 makes the optical signal outputted from the DGEQ 51 branch, and outputs it to the OCM 53 and the BS 54.

The OCM 53 monitors optical power of the optical signal outputted from the BS 52 according to wavelengths. The monitored optical power is outputted to the DGEQ controller 57.

The BS 54 makes the optical signal outputted from the BS 52 branch, and outputs it to the PD 55 and a transmission line (not illustrated).

The PD 55 monitors optical power of the optical signal outputted from the BS 54. The monitored optical power is outputted to the AGC controller 56.

On the basis of the optical power of the optical signal monitored by the PD 43 and the optical power of the optical signal monitored by the PD 55, the AGC controller 56 controls power of an excitation light outputted from the LD 44 so as to keep the gain of the EDF 46 constant at set gain. For example, the gain of the EDF 46 can be calculated on the basis of the optical power of the optical signal monitored by the PD 43 and the optical power of the optical signal monitored by the PD 55. The AGC controller 56 controls power of an excitation light outputted from the LD 44 so as to keep the gain of the EDF 46 calculated constant at the set gain.

The DGEQ controller 57 controls the DGEQ 51 so that it will have a loss-wavelength characteristic corresponding to a gain tilt of the EDF 46 which occurs according to the set gain. This loss-wavelength characteristic cancels the gain tilt of the EDF 46 which occurs according to the set gain. That is to say, this loss-wavelength characteristic makes gain for the optical signal outputted from the DGEQ 51 flat with respect to wavelengths at the set gain of the EDF 46.

For example, it is assumed that the loss-wavelength characteristic of the GEQ 48 is set so as to make output gain of the GEQ 48 flat with respect to wavelengths at the time of the gain of the EDF 46 being determined set gain Gmax. For example, Gmax is the largest gain set for the EDF 46. That is to say, it is assumed that when the gain of the EDF 46 is set to the largest gain Gmax, output gain of the GEQ 48 is flat with respect to wavelengths.

It is assumed that the gain of the EDF 46 is set (changed) to Gset (Gset<Gmax). In this case, a reduction in gain causes a gain tilt of the EDF 46. As a result, output gain of the GEQ 48 is not flat with respect to wavelengths. This change in the output gain of the GEQ 48 caused by the gain tilt results from changing the gain of the EDF 46 by (Gmax−Gset). On the basis of the above expression (2), the change in the output gain of the GEQ 48 is given by $$y3 = G\text{tilt\_ref}(\lambda) \times (G\text{max} - G\text{set}) \quad (3)$$

Therefore, the DGEQ controller 57 controls the DGEQ 51 so that loss corresponding to the gain given by expression (3) will occur. By doing so, output gain of the DGEQ 51 becomes flat with respect to wavelengths. A loss-wavelength characteristic of the DGEQ 51 controlled is expressed as $$\text{Loss}(\lambda, G\text{set}) = G\text{tilt\_ref}(\lambda) \times (G\text{max} - G\text{set}) \quad (4)$$

That is to say, the DGEQ controller 57 controls the DGEQ 51 so that when the gain of the EDF 46 is set to Gset, loss indicated by expression (4) will occur for each wavelength. By doing so, output gain of the DGEQ 51 can be made flat with respect to wavelengths.

For example, information regarding a gain tilt per 1 dB of the EDF 46 indicated in FIG. 6 is stored in a memory (not illustrated in FIG. 3) of the optical amplification apparatus. For example, the DGEQ controller 57 calculates (Gmax−Gset) on the basis of the above Gmax (largest gain set for the EDF 46) and gain set for the EDF 46, and calculates a loss-wavelength characteristic of the controlled DGEQ 51 by expression (4) on the basis of a value obtained and the gain tilt per unit stored in the memory.

In addition, a gain tilt corresponding to Gset calculated in advance may be stored in the memory.

Figure 7:
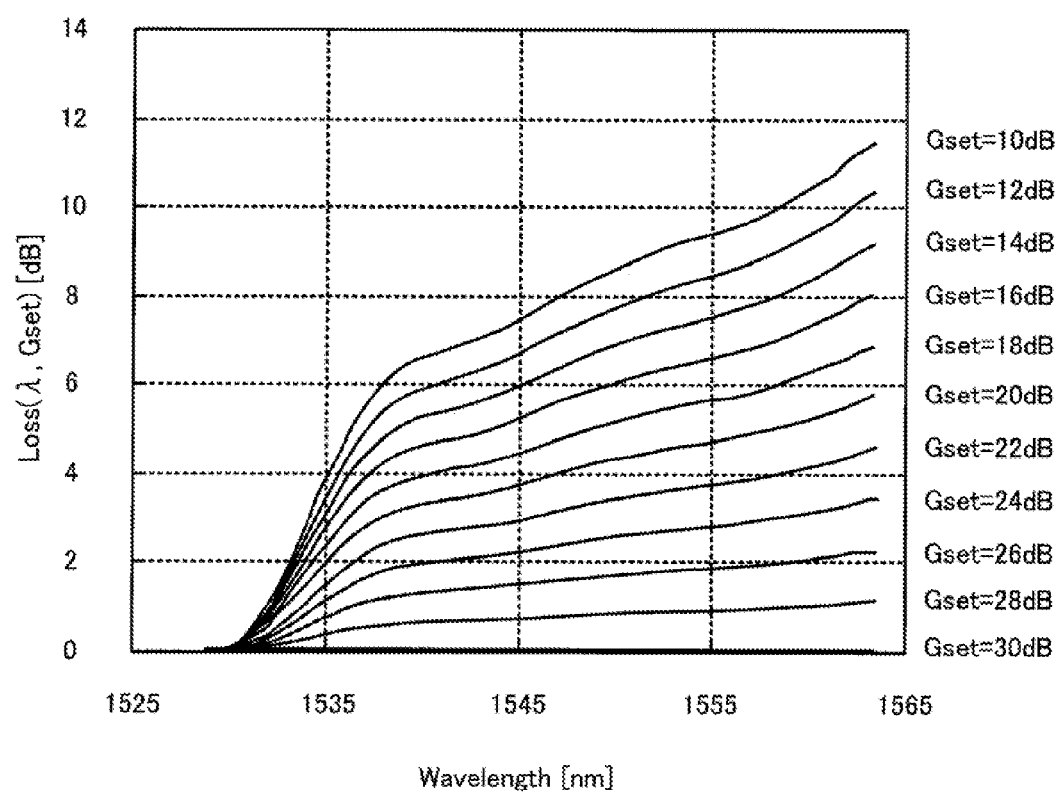
FIG. 7 is an example of a loss-wavelength characteristic relative to Gset.

FIG. 7 is an example of a loss-wavelength characteristic relative to Gset. In FIG. 7, a horizontal axis indicates a wavelength and a vertical axis indicates gain. Each waveform in FIG. 7 indicates a loss-wavelength characteristic of the controlled DGEQ 51 at the time of setting the gain of the EDF 46 to 30, 28, . . . , or 10 dB.

Each loss-wavelength characteristic indicated in FIG. 7 is calculated in advance and is stored in the memory. For example, a loss-wavelength characteristic corresponding to gain set for the EDF 46 is calculated in advance on the basis of the gain tilt per unit of the EDF 46, Gmax, and the gain set for the EDF 46, and is stored in the memory. The DGEQ controller 57 refers to the memory on the basis of the gain set for the EDF 46, and acquires the loss-wavelength characteristic corresponding to the gain set for the EDF 46. For example, if the gain of the EDF 46 is set to 22 dB, then the DGEQ controller 57 acquires a loss-wavelength characteristic corresponding to "Gset=22 dB" indicated in FIG. 7 from the memory.

In the example of FIG. 7, a loss-wavelength characteristic of the GEQ 48 is set so that when the gain of the EDF 46 is 30 dB, its output gain will be flat with respect to wavelengths. That is to say, in the example of FIG. 7 Gmax=30 dB. Accordingly, a loss-wavelength characteristic corresponding to "Gset=30 dB" is 0 dB.

Furthermore, if the gain of the EDF 46 is set to a value which is not stored in the memory, then the DGEQ controller 57 may acquire loss-wavelength characteristics corresponding to gain close to the set value from the memory and perform interpolation. For example, the DGEQ controller 57 may acquire two loss-wavelength characteristics corresponding to gain close to the value which is not stored in the memory from the memory, calculate the average of the two loss-wavelength characteristics, and consider the average as a loss-wavelength characteristic corresponding to the set value.

An example of the DGEQ 51 will now be described.

Figure 8:
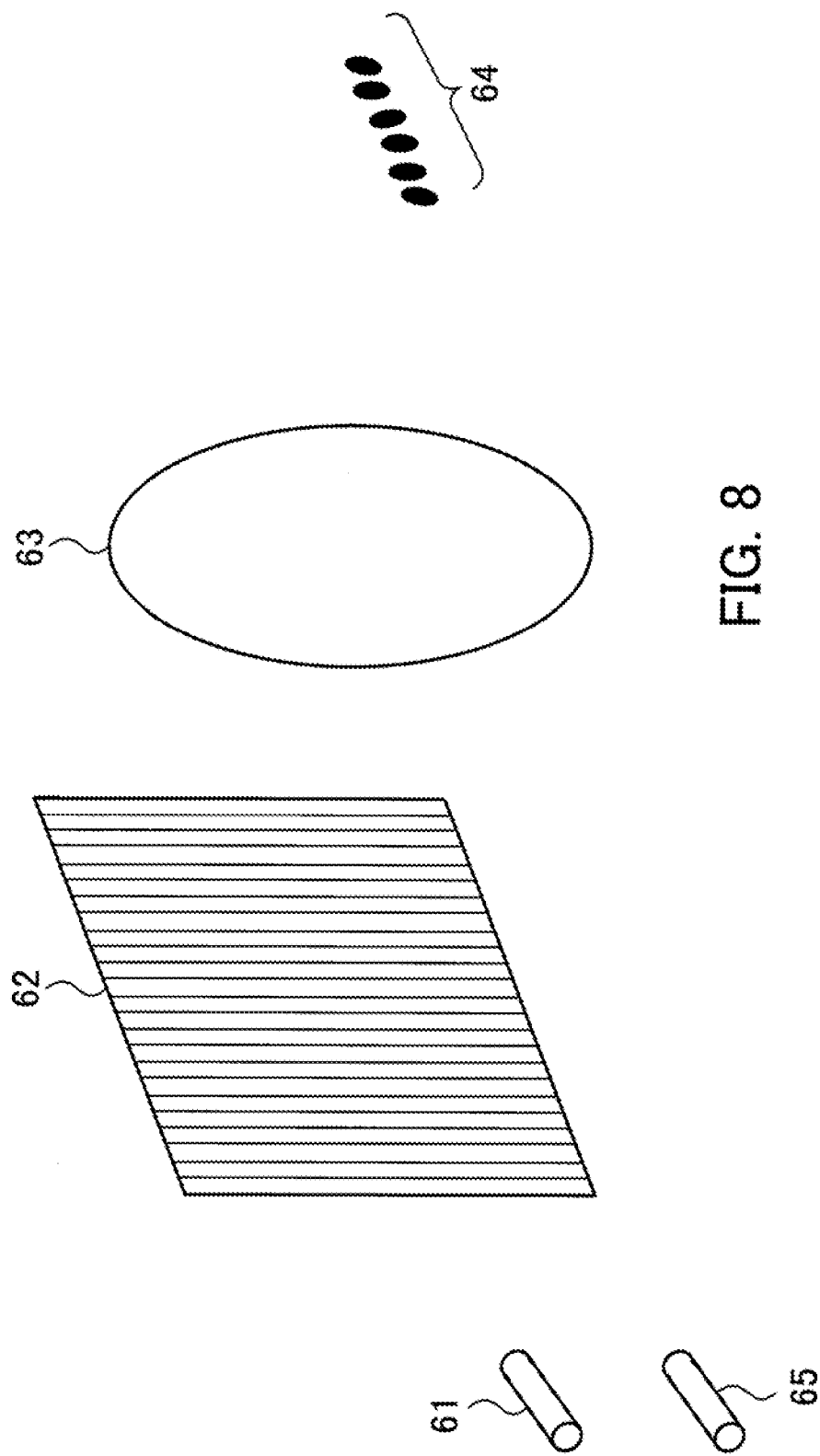
FIG. 8 illustrates an example of the structure of a DGEQ (part 1)

FIG. 8 illustrates an example of the structure of the DGEQ (part 1). As illustrated in FIG. 8, the DGEQ 51 includes collimators 61 and 65, a diffraction grating 62, a lens 63, and MEMS (Micro-Electro-Mechanical System) mirrors 64.

Figure 9:
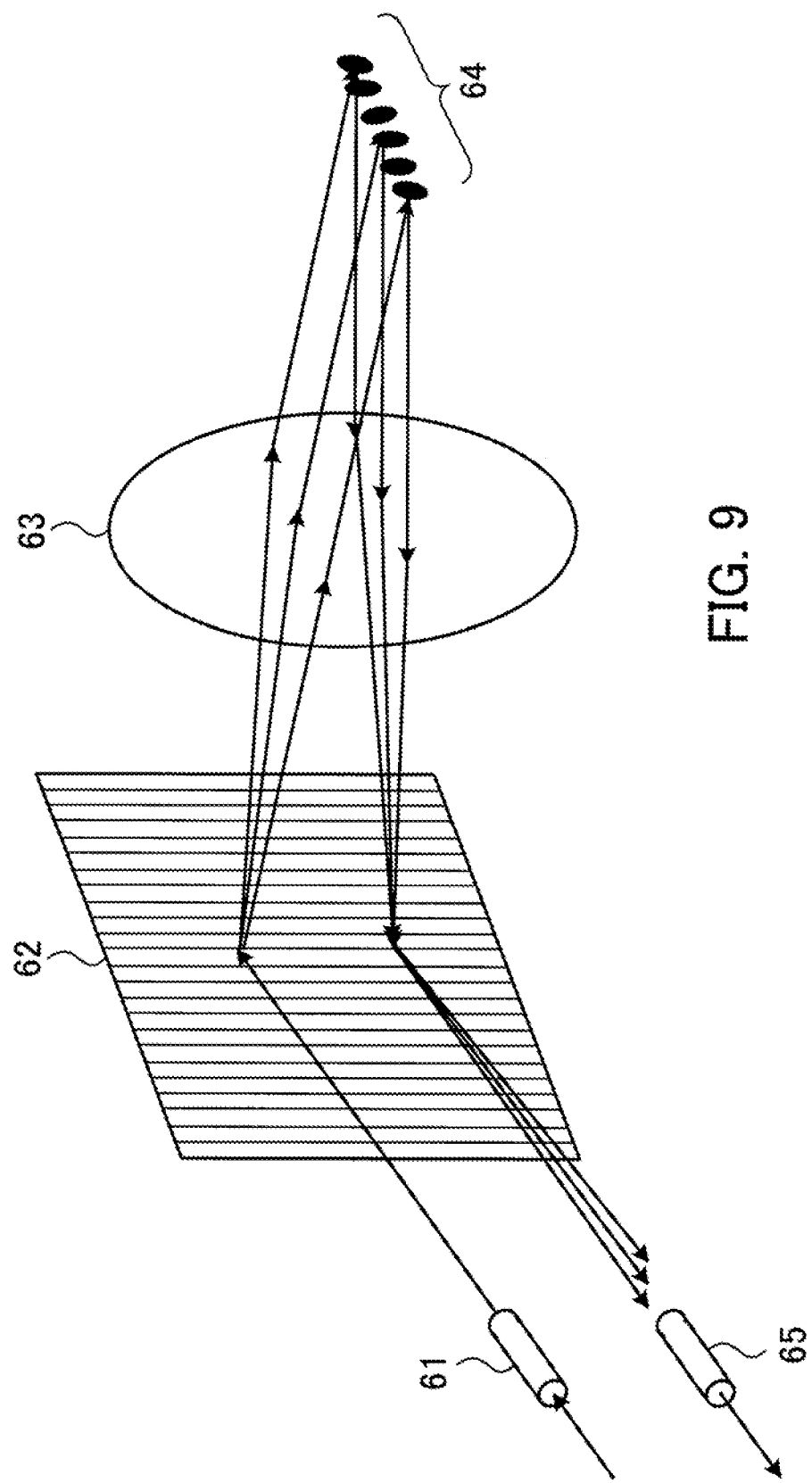
FIG. 9 is a view for describing the operation of the DGEQ of FIG. 8.

FIG. 9 is a view for describing the operation of the DGEQ of FIG. 8. Components in FIG. 9 which are the same as those illustrated in FIG. 8 are marked with the same symbols and descriptions of them will be omitted.

Each arrow in FIG. 9 indicates a light path. Light inputted to the DGEQ 51 is directed to the diffraction grating 62 via the collimator 61. The light directed to the diffraction grating 62 is separated into light components and the light components are directed to the MEMS mirrors 64 via the lens 63.

Many MEMS mirrors 64 are arranged (in the direction of wavelengths of the light components) according to the wavelengths of the light components. The light components reflected from the MEMS mirrors 64 are directed to the diffraction grating 62 via the lens 63 and are inputted to the collimator 65. The light components inputted to the collimator 65 are outputted to the BS 52 illustrated in FIG. 3.

By changing an angle of each MEMS mirror 64, the coupling efficiency of a light component inputted to the collimator 65 can be changed. That is to say, by changing an angle of each MEMS mirror 64, loss at each wavelength can be changed. The angle of each MEMS mirror 64 is controlled by the DGEQ controller 57.

The DGEQ 51 with high wavelength resolution can be realized by increasing the number of the MEMS mirrors 64.

Figure 10:
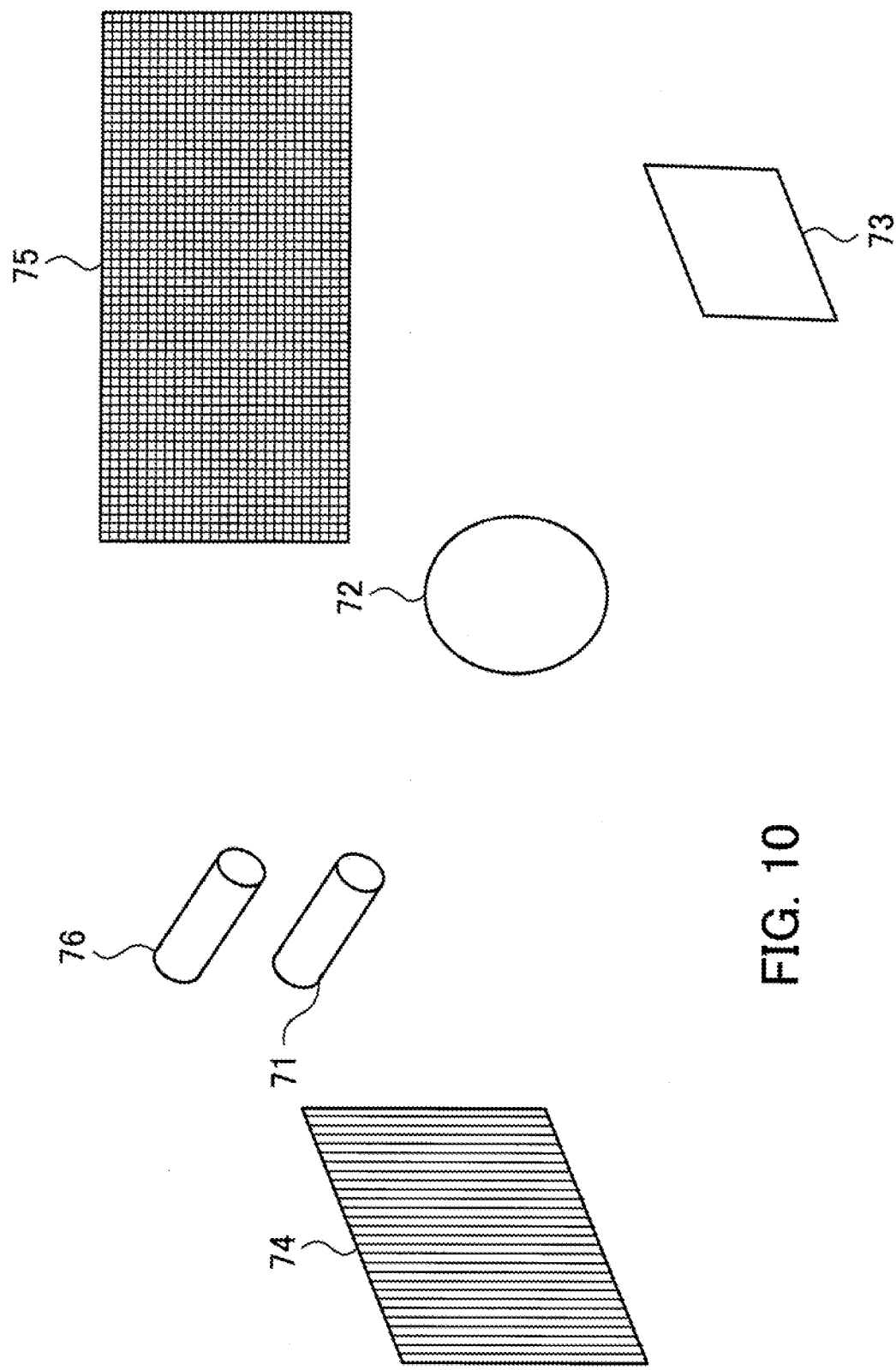
FIG. 10 illustrates an example of the structure of a DGEQ (part 2)

FIG. 10 illustrates an example of the structure of the DGEQ (part 2). As illustrated in FIG. 10, the DGEQ 51 includes collimators 71 and 76, a lens 72, a mirror 73, a diffraction grating 74, and a DMD (Digital Micro mirror Device) 75.

Figure 11:
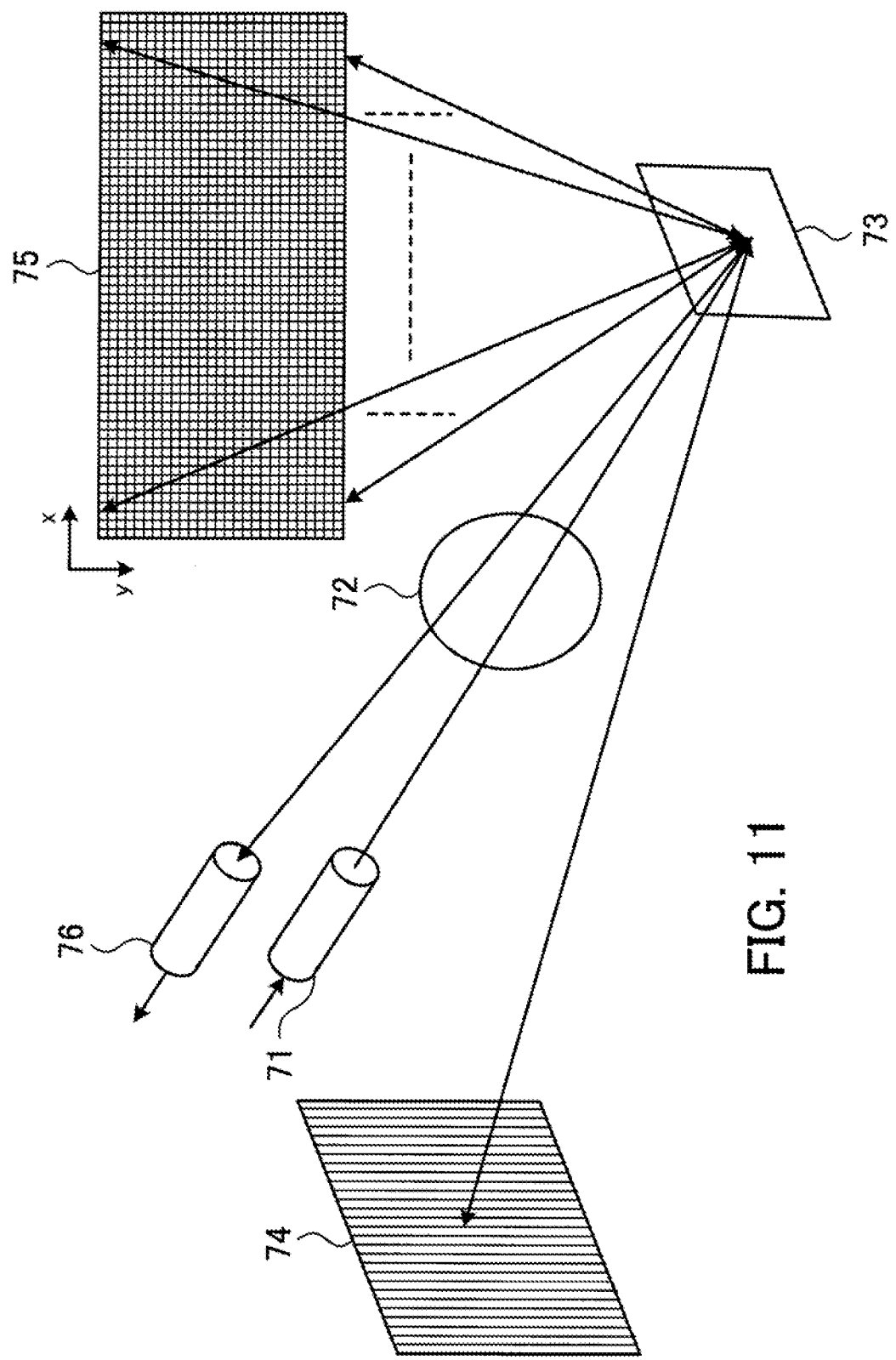
FIG. 11 is a view for describing the operation of the DGEQ of FIG. 10.

FIG. 11 is a view for describing the operation of the DGEQ of FIG. 10. Components in FIG. 11 which are the same as those illustrated in FIG. 10 are marked with the same symbols and descriptions of them will be omitted.

Each arrow in FIG. 11 indicates a light path. Light inputted to the DGEQ 51 is directed to the diffraction grating 74 via the collimator 71, the lens 72, and the mirror 73. The light directed to the diffraction grating 74 is separated into light components and the light components are directed to the DMD 75 via the mirror 73.

The light components directed to the DMD 75 are inputted to the collimator 76 via the mirror 73, the diffraction grating 74, the mirror 73, and the lens 72. The light components inputted to the collimator 76 are outputted to the BS 52 illustrated in FIG. 3.

An X-axis direction of the DMD 75 corresponds to the direction of wavelengths of the light components. The light components into which the diffraction grating 74 separates the light are dispersed in the X-axis direction according to wavelengths and are directed to the DMD 75. The light components corresponding to the wavelengths on the X-axis are directed to all columns in a Y-axis direction. Accordingly, with the DMD 75 the coupling efficiency of a light component with each wavelength (on the X-axis) inputted to the collimator 76 can be changed by the number of mirrors in the Y-axis direction. An angle of each mirror in the DMD 75 is controlled by the DGEQ controller 57.

The DMD 75 is generally used as DLP (Digital Light Processing (registered trademark)) in projectors. The number of pixels in the DMD 75 which has been put to practical use is 1280×720, 1920×1080 or the like. Its wavelength resolution is high.

Figure 12:
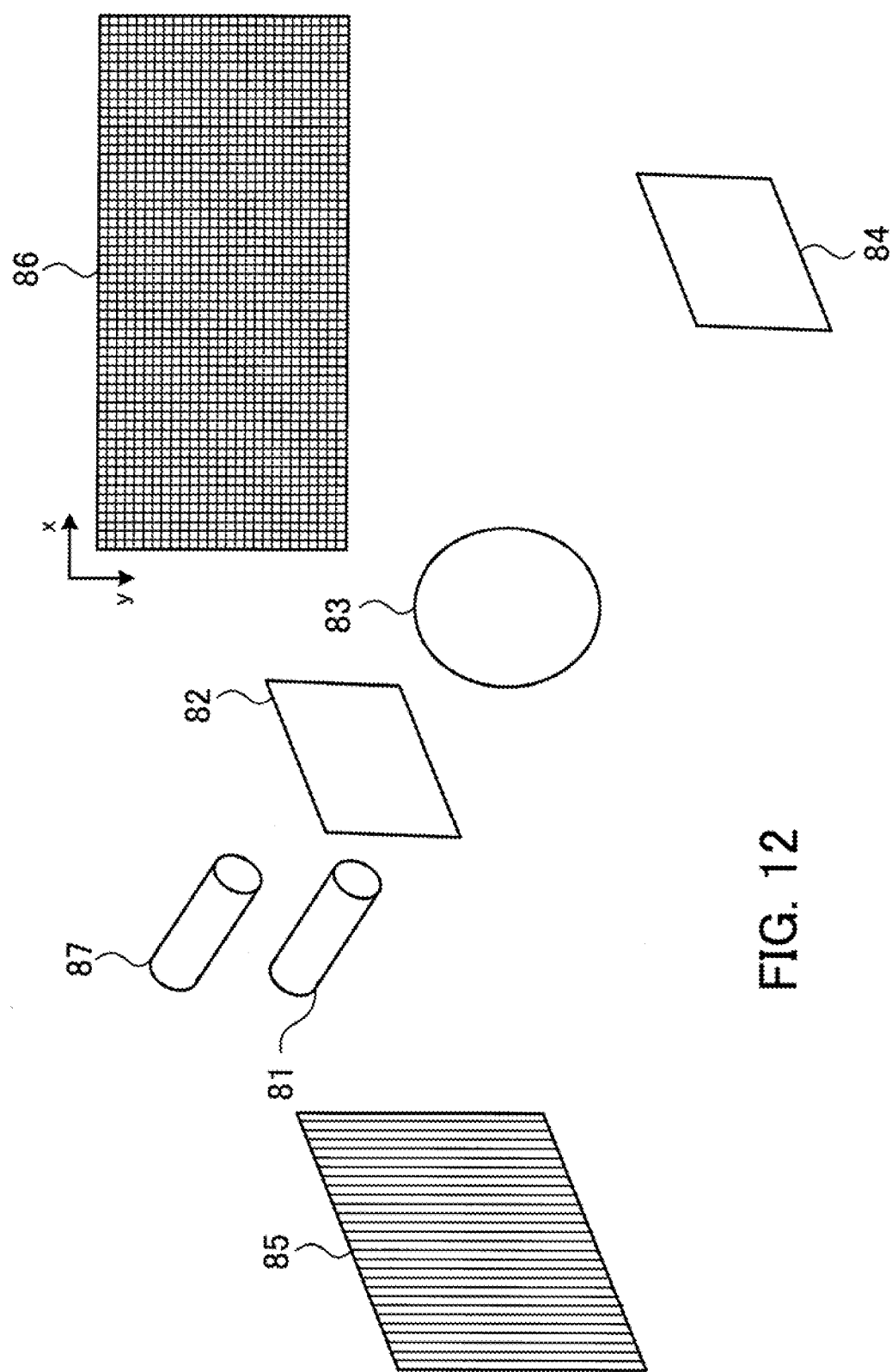
FIG. 12 illustrates an example of the structure of a DGEQ (part 3)

FIG. 12 illustrates an example of the structure of the DGEQ (part 3). As illustrated in FIG. 12, the DGEQ includes collimators 81 and 87, a polarization diversity device 82, a lens 83, a mirror 84, a diffraction grating 85, and a LCOS (Liquid Crystal On Silicon) 86.

Figure 13:
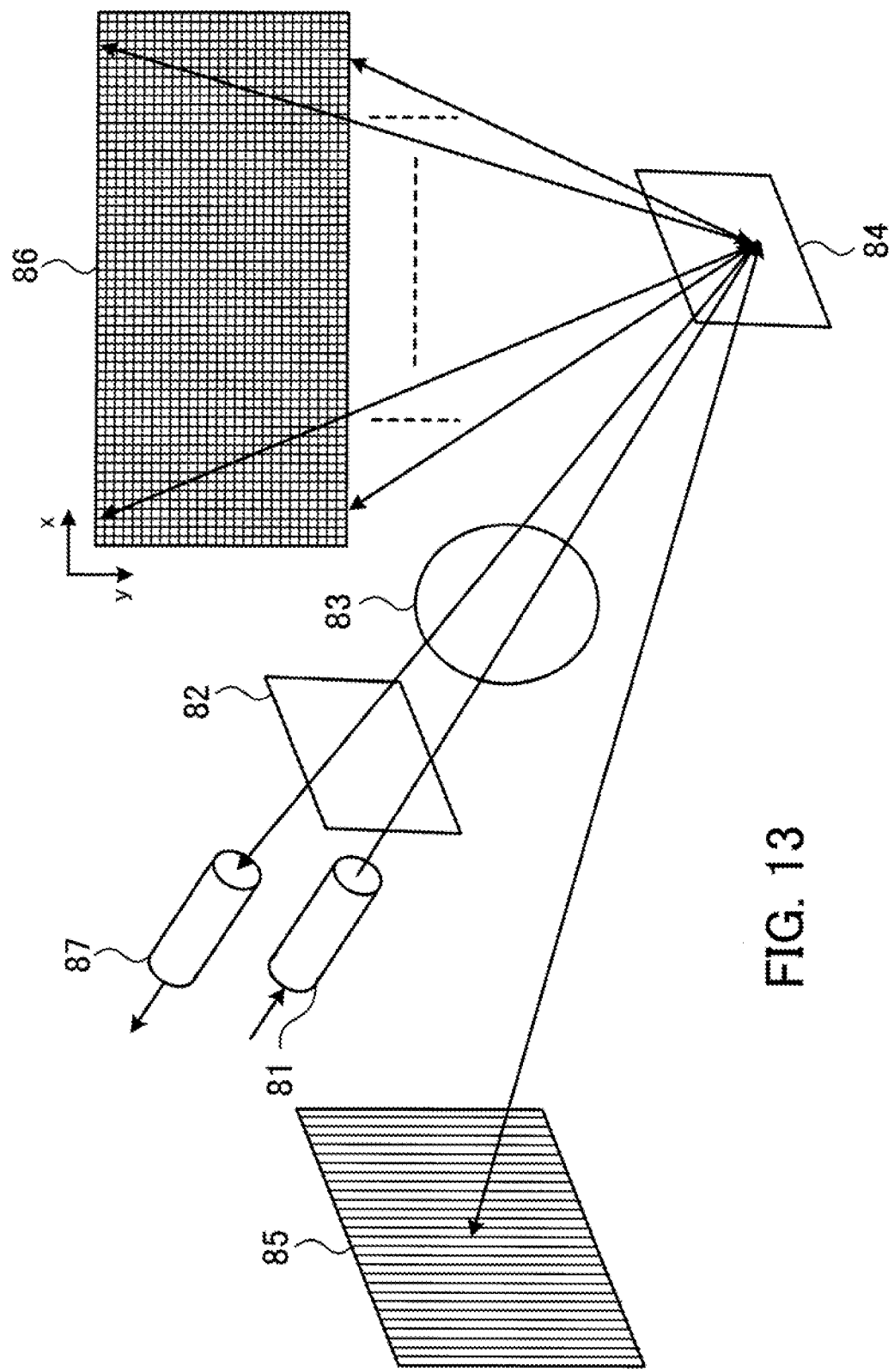
FIG. 13 is a view for describing the operation of the DGEQ of FIG. 12.

FIG. 13 is a view for describing the operation of the DGEQ of FIG. 12. Components in FIG. 13 which are the same as those illustrated in FIG. 12 are marked with the same symbols and descriptions of them will be omitted.

Each arrow in FIG. 13 indicates a light path. Light inputted to the DGEQ 51 is directed to the diffraction grating 85 via the collimator 81, the polarization diversity device 82, the lens 83, and the mirror 84. The light directed to the diffraction grating 85 is separated into light components and the light components are directed to the LCOS 86 via the mirror 84.

The light components directed to the LCOS 86 are inputted to the collimator 87 via the mirror 84, the diffraction grating 85, the mirror 84, the lens 83, and the polarization diversity device 82. The light components inputted to the collimator 87 are outputted to the BS 52 illustrated in FIG. 3.

An X-axis direction of the LCOS 86 corresponds to the direction of wavelengths of the light components. The light components into which the diffraction grating 85 separates the light are dispersed in the X-axis direction according to wavelengths and are directed to the LCOS 86. The light components corresponding to the wavelengths on the X-axis are directed to all columns in a Y-axis direction. Accordingly, with the LCOS 86 LCOS in the Y-axis direction causes a difference in phase between light components. A reflection angle is changed by the use of interference. By doing so, the coupling efficiency of a light component with each wavelength inputted to the collimator 87 can be changed. A difference in phase between light components caused by the LCOS 86 is controlled by the DGEQ controller 57.

The number of pixels in the LCOS 86 which has been put to practical use is 1920×1080, or the like. Its wavelength resolution is high.

Figure 14:
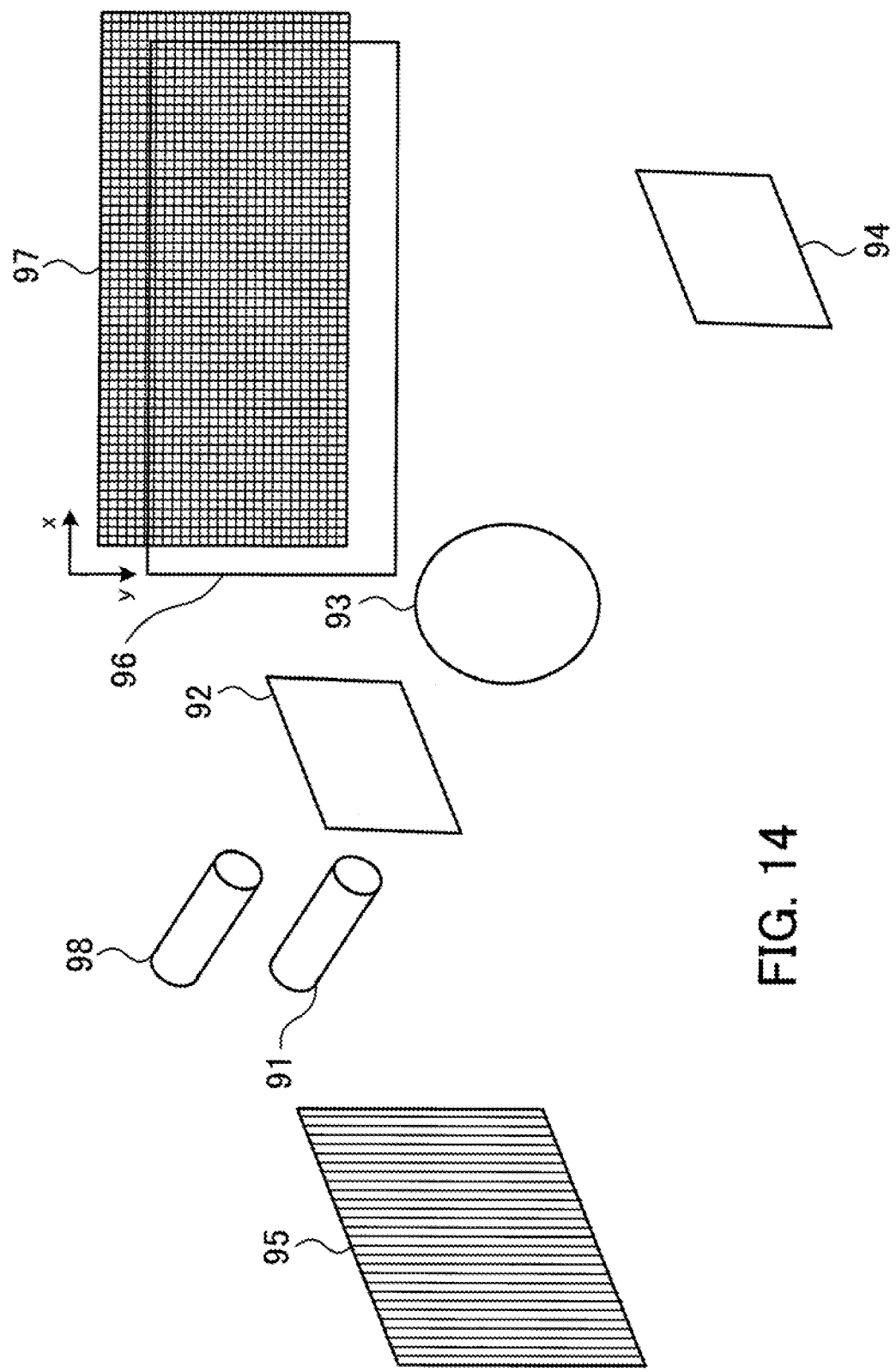
FIG. 14 illustrates an example of the structure of a DGEQ (part 4)

FIG. 14 illustrates an example of the structure of the DGEQ (part 4). As illustrated in FIG. 14, the DGEQ includes collimators 91 and 98, a polarization diversity device 92, a lens 93, a mirror 94, a diffraction grating 95, a polarizer 96, and a LCOS 97.

Figure 15:
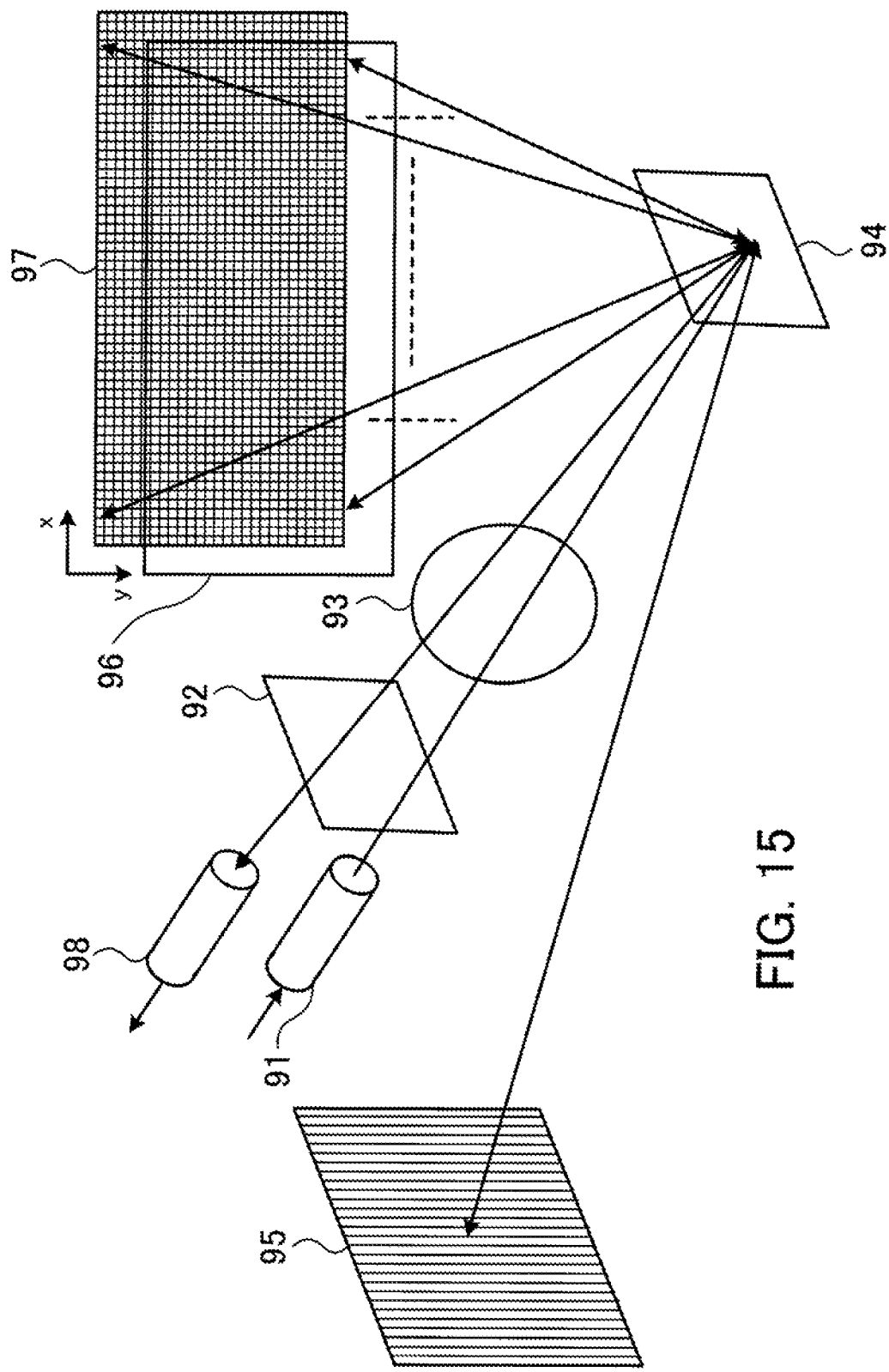
FIG. 15 is a view for describing the operation of the DGEQ of FIG. 14.

FIG. 15 is a view for describing the operation of the DGEQ of FIG. 14. Components in FIG. 15 which are the same as those illustrated in FIG. 14 are marked with the same symbols and descriptions of them will be omitted.

Each arrow in FIG. 15 indicates a light path. Light inputted to the DGEQ 51 is directed to the diffraction grating 95 via the collimator 91, the polarization diversity device 92, the lens 93, and the mirror 94. The light directed to the diffraction grating 95 is separated into light components and the light components are directed to the LCOS 97 via the mirror 94 and the polarizer 96.

The light components directed to the LCOS 97 are inputted to the collimator 98 via the polarizer 96, the mirror 94, the diffraction grating 95, the mirror 94, the lens 93, and the polarization diversity device 92. The light components inputted to the collimator 98 are outputted to the BS 52 illustrated in FIG. 3.

An X-axis direction of the LCOS 97 corresponds to the direction of wavelengths of the light components. The light components into which the diffraction grating 95 separates the light are dispersed in the X-axis direction according to wavelengths and are directed to the LCOS 97. The light components corresponding to the wavelengths on the X-axis are directed to all columns in a Y-axis direction. Accordingly, with the LCOS 97 LCOS in the Y-axis direction causes a change in polarization angle of each light component. The polarizer 96 causes a change in transmittance of each light component. By doing so, the coupling efficiency of a light component with each wavelength inputted to the collimator 98 can be changed. A change in polarization angle caused by the LCOS 97 is controlled by the DGEQ controller 57.

Figure 16:
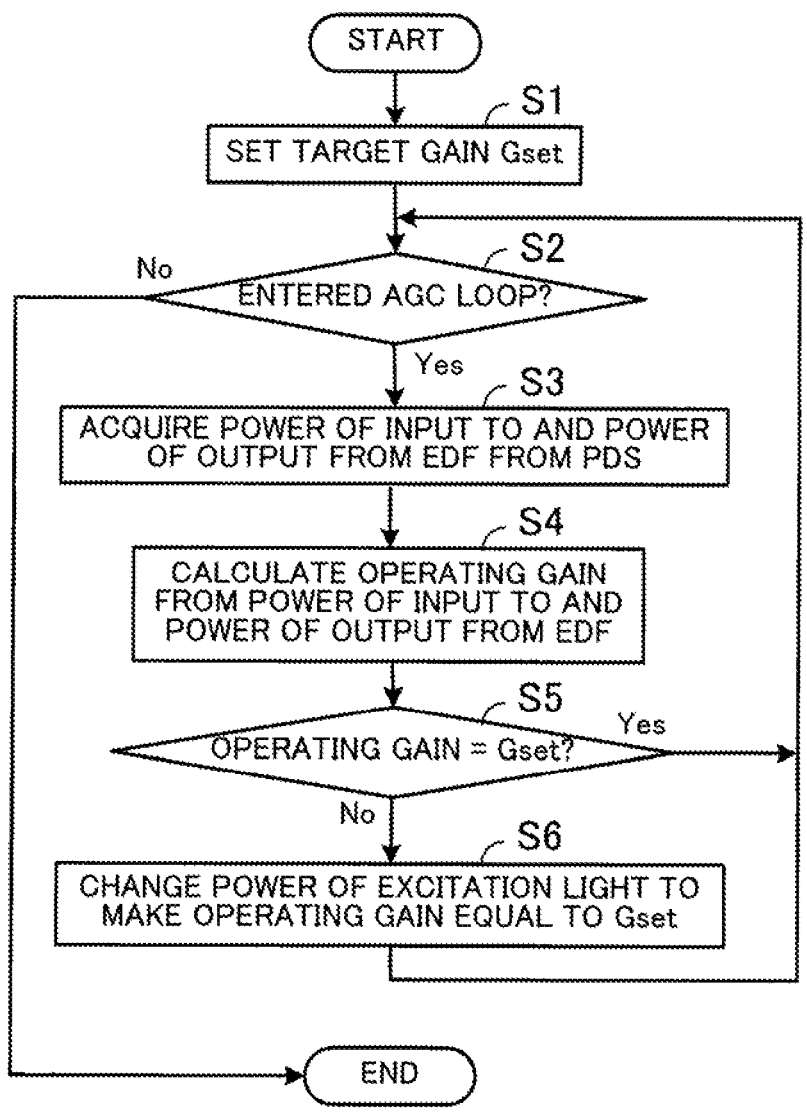
FIG. 16 is a flow chart of an example of the operation of an AGC controller.

FIG. 16 is a flow chart of an example of the operation of the AGC controller.

(S1) The AGC controller 56 sets target gain Gset of the EDF 46.

(S2) The AGC controller 56 determines whether or not it has entered an AGC loop. For example, the AGC controller 56 determines whether or not a period in which AGC control is exercised has begun. If the AGC controller 56 has entered an AGC loop, then the AGC controller 56 proceeds to operation S3. If the AGC controller 56 has not entered an AGC loop, then the process terminates.

(S3) The AGC controller 56 acquires power of input to the EDF 46 and power of output from the EDF 46 from the PDs 43 and 55 respectively.

(S4) The AGC controller 56 calculates operating gain of the EDF 46 from the power of the input to and the power of the output from the EDF 46 acquired in operation S3. For example, operating gain can be calculated by $$Gmon = Pout/Pin \qquad (5)$$

where Pout is optical power monitored by the PD 55 illustrated in FIG. 3 and Pin is optical power monitored by the PD 43 illustrated in FIG. 3.

Pout includes ASE power which is generated in the EDF 46 and which is monitored by the PD 55. Accordingly, in order to calculate proper gain, the ASE power may be compensated for. In this case, operating gain can be calculated by $$Gmon = (Pout - Pase)/Pin \qquad (6)$$

where Pase is ASE power generated in the EDF 46. In addition, operating gain may be calculated by $$Gmon = Pout/(Pin + A) \qquad (7)$$

where A=Pase/Gset.

(S5) The AGC controller 56 determines whether or not the operating gain of the EDF 46 is equal to the target gain Gset. If the operating gain of the EDF 46 is equal to the target gain Gset, then the AGC controller 56 proceeds to operation S2. If the operating gain of the EDF 46 is not equal to the target gain Gset, then the AGC controller 56 proceeds to operation S6.

(S6) The AGC controller 56 changes power of an excitation light outputted from the LD 44 so that the operating gain of the EDF 46 will be equal to the target gain Gset.

Figure 17:
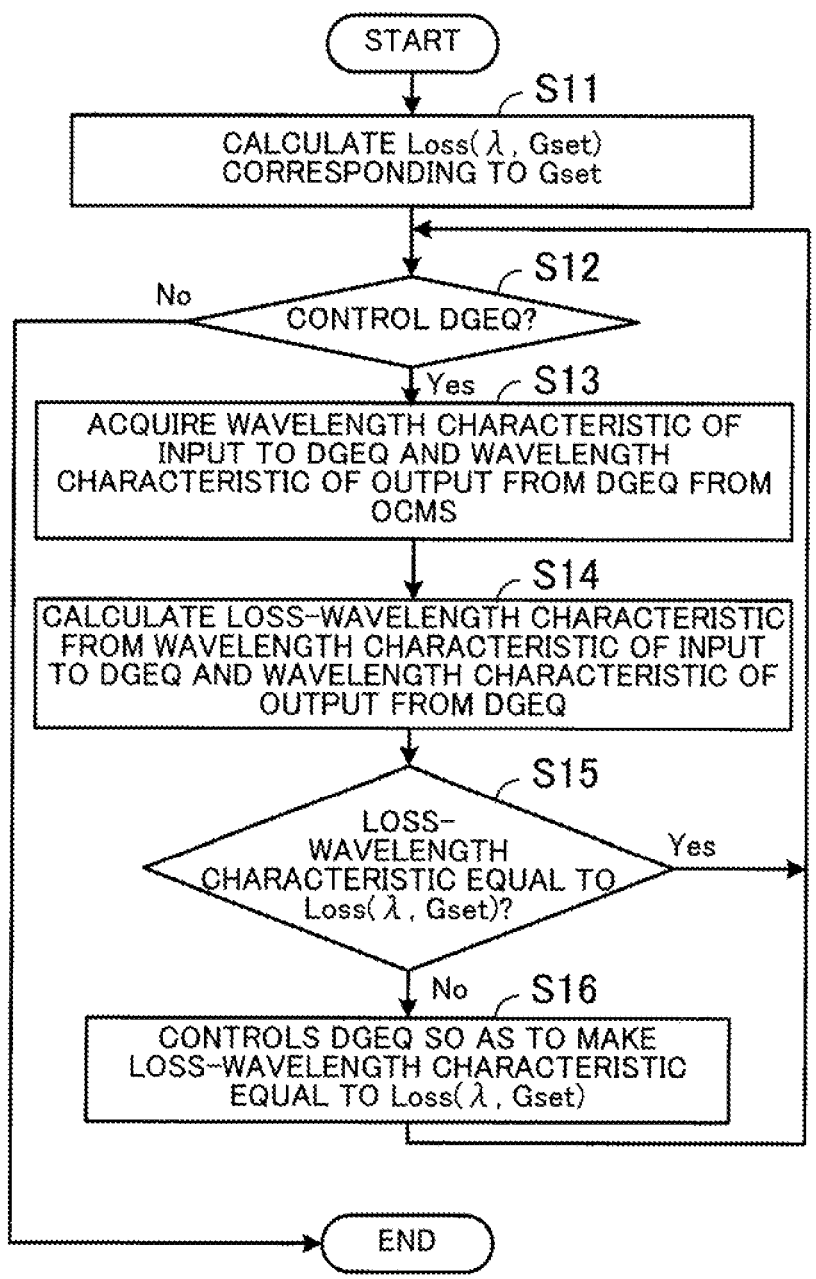
FIG. 17 is a flow chart of an example of the operation of a DGEQ controller.

FIG. 17 is a flow chart of an example of the operation of the DGEQ controller.

(S11) The DGEQ controller 57 calculates a loss-wavelength characteristic corresponding to target gain Gset of the EDF 46. For example, the DGEQ controller 57 calculates a loss-wavelength characteristic by expression (4). Alternatively, the DGEQ controller 57 acquires a loss-wavelength characteristic corresponding to Gset described in FIG. 7 from the memory.

(S12) The DGEQ controller 57 determines whether or not the DGEQ controller 57 controls the DGEQ 51. For example, the DGEQ controller 57 determines whether or not a period in which the DGEQ controller 57 controls the DGEQ 51 has begun. If the DGEQ controller 57 controls the DGEQ 51, then the DGEQ controller 57 proceeds to operation S13. If the DGEQ controller 57 does not control the DGEQ 51, then the process terminates.

(S13) The DGEQ controller 57 acquires a wavelength characteristic of optical power of input to the DGEQ 51 and a wavelength characteristic of optical power of output from the DGEQ 51 from the OCMs 50 and 53 respectively.

(S14) The DGEQ controller 57 calculates a loss-wavelength characteristic of the DGEQ 51 from the wavelength characteristic of the optical power of the input to the DGEQ 51 and the wavelength characteristic of the optical power of the output from the DGEQ 51 acquired in operation S13. For example, a loss-wavelength characteristic of the DGEQ 51 can be calculated by $$\text{Loss\_mon}(\lambda) = \text{OCM2}(\lambda) - \text{OCM1}(\lambda) \quad (8)$$

where OCM2($\lambda$) is the wavelength characteristic of the optical power monitored by the OCM 53 illustrated in FIG. 3 and OCM1($\lambda$) is the wavelength characteristic of the optical power monitored by the OCM 50 illustrated in FIG. 3.

(S15) The DGEQ controller 57 determines whether or not the loss-wavelength characteristic of the DGEQ 51 calculated in operation S14 is equal to the loss-wavelength characteristic calculated or acquired in operation S11. If the loss-wavelength characteristic of the DGEQ 51 calculated in operation S14 is equal to the loss-wavelength characteristic calculated in operation S11, then the DGEQ controller 57 proceeds to operation S12. If the loss-wavelength characteristic of the DGEQ 51 calculated in operation S14 is not equal to the loss-wavelength characteristic calculated in operation S11, then the DGEQ controller 57 proceeds to operation S16.

A determined margin may be set for determining whether or not the loss-wavelength characteristic of the DGEQ 51 calculated in operation S14 is equal to the loss-wavelength characteristic calculated in operation S11. For example, a margin may be set as indicated by $$\text{Loss\_mon}(\lambda) - \text{Loss}(\lambda, G\text{set}) < \pm 0.5 \text{ (dB)} \quad (9)$$

(S16) The DGEQ controller 57 controls the DGEQ 51 so that the loss-wavelength characteristic of the DGEQ will be equal to the loss-wavelength characteristic calculated in operation S11.

The AGC control described in FIG. 16 and the DGEQ control described in FIG. 17 are exercised in parallel. Usually the speed of the AGC control is higher than the speed of the DGEQ control. If the speeds of monitoring by the OCMs 50 and 53 and the speed of the DGEQ control can be made higher than the speed of the AGC control, then the speed of the DGEQ control may be made higher than the speed of the AGC control.

As has been described, the optical amplification apparatus controls the DGEQ 51 so that it will have a loss-wavelength characteristic corresponding to a gain tilt which occurs according to gain of the EDF 46 set. By doing so, the optical amplification apparatus can make its gain flat with respect to wavelengths according to gain of the EDF 46 set.

In addition, the optical amplification apparatus can set gain of the EDF 46, so the optical amplification apparatus can control the optical level of output from the EDF 46. Accordingly, high excitation light power is unnecessary. As a result, the optical amplification apparatus can reduce power consumption.

For example, an optical amplification apparatus which exercises control so as to make gain of an EDF constant and which changes the gain by a VOA is known. With this optical amplification apparatus the power of output from the EDF increases with an increase in the power of input to the EDF. Accordingly, high excitation light power is necessary. With the optical amplification apparatus illustrated in FIG. 3, on the other hand, it is possible to set gain of the EDF 46 and control the optical level of output. As a result, high excitation light power is unnecessary.

Figure 18:
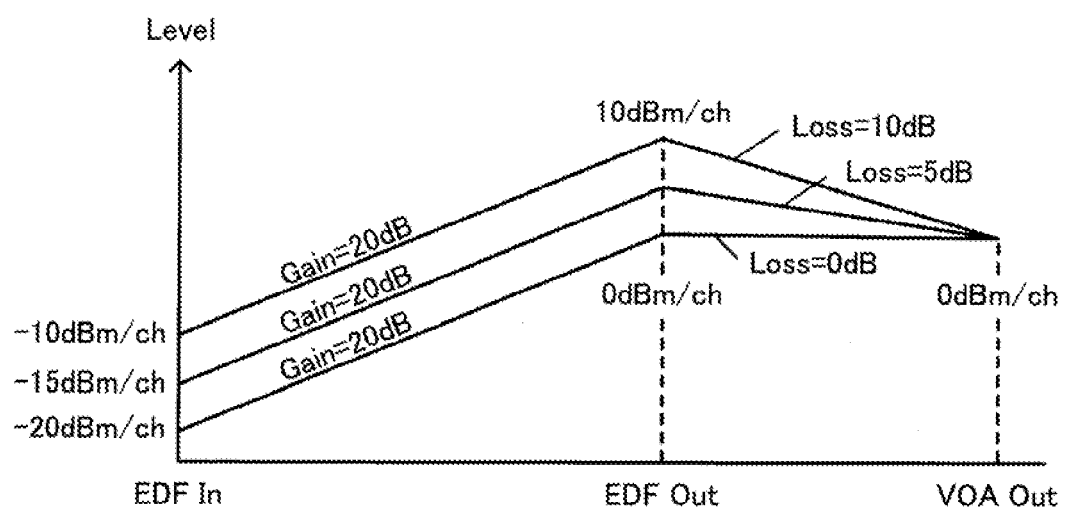
FIG. 18 is an example of a level diagram of an optical amplification apparatus which exercises gain control by a VOA.

FIG. 18 is an example of a level diagram of an optical amplification apparatus which exercises gain control by a VOA. In FIG. 18, a horizontal axis indicates a point in the optical amplification apparatus at which an optical signal is outputted, and a vertical axis indicates an optical level.

It is assumed that control is exercised so as to keep gain of an EDF constant at 20 dB. As indicated in FIG. 18, when the optical level of input to the EDF (EDF In FIG. 18) is −20 dBm/ch, the optical level of output from the EDF (EDF Out in FIG. 18) is 0 dBm/ch. When the optical level of input to the EDF is −15 dBm/ch, the optical level of output from the EDF is 5 dBm/ch. When the optical level of input to the EDF is −10 dBm/ch, the optical level of output from the EDF is 10 dBm/ch. The VOA attenuates the optical level of output from the EDF and controls gain of the optical amplification apparatus.

This optical amplification apparatus exercises control so as to make gain of the EDF constant, and attenuates an optical level by the VOA. As stated above, however, the power of output from the EDF increases with an increase in the power of input to the EDF and very high excitation light power is necessary. In FIG. 18, for example, an optical signal the optical level of which is −10 dBm/ch needs high excitation light power, compared with an optical signal the optical level of which is −20 dBm/ch.

On the other hand, the optical amplification apparatus illustrated in FIG. 3 can set gain of the EDF 46, so it can control the optical level of output from the EDF 46. That is to say, the optical amplification apparatus illustrated in FIG. 3 can reduce power consumption.

In addition, if the DGEQ 51 included in the optical amplification apparatus includes the DMD or the LCOS described in FIGS. 10 through 15, then the OCMs 50 and 53 are unnecessary. The reason for this is that the DMD or the LCOS has a loss setting function. For example, the LCOS has preset parameters indicative of the relationship between voltage (V) applied to it and loss (dB) according to wavelengths. The DGEQ controller 57 can set a calculated or acquired loss-wavelength characteristic for the DGEQ 51.

A third embodiment will now be described in detail with reference to the drawing. An optical amplification apparatus according to a third embodiment includes two EDFs and can set high gain.

Figure 19:
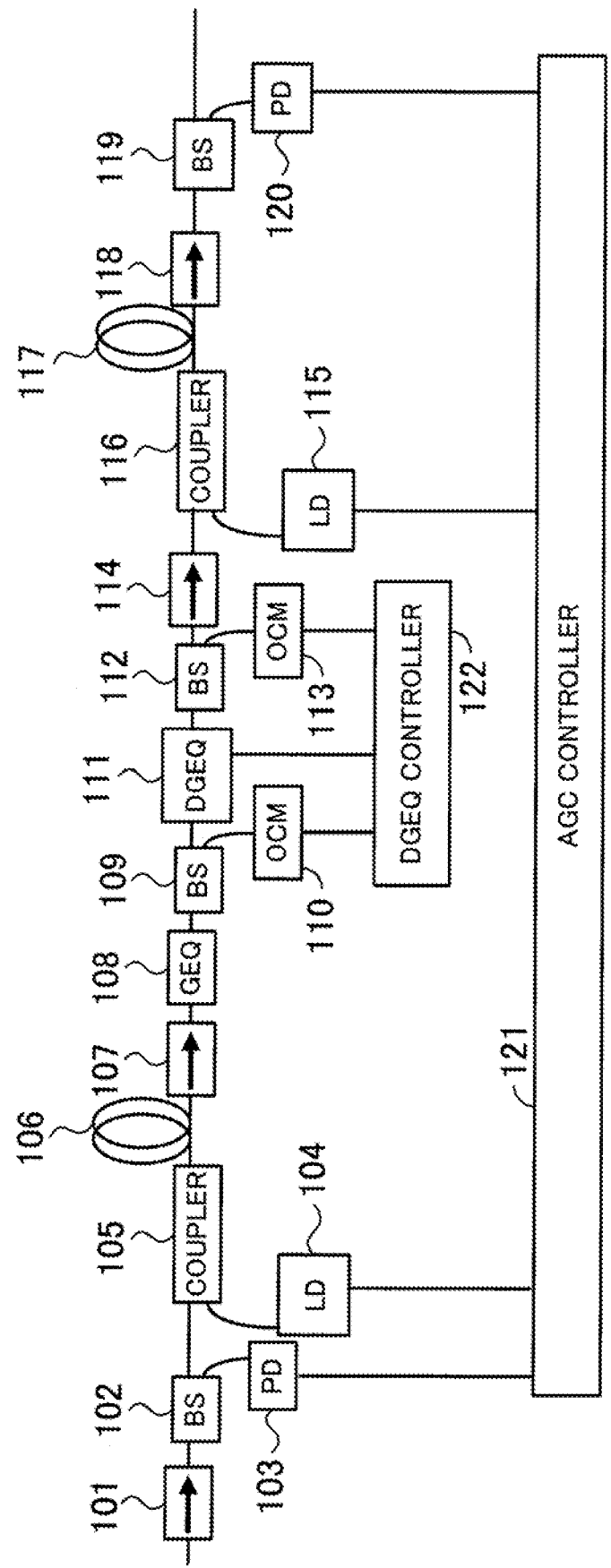
FIG. 19 illustrates an example of an optical transmission system to which an optical amplification apparatus according to a third embodiment is applied.

FIG. 19 illustrates an example of an optical transmission system to which an optical amplification apparatus according to a third embodiment is applied. As illustrated in FIG. 19, an optical amplification apparatus includes isolators 101, 107, 114, and 118, BSes 102, 109, 112, and 119, PDs 103 and 120, LDs 104 and 115, couplers 105 and 116, EDFs 106 and 117, a GEQ 108, OCMs 110 and 113, a DGEQ 111, an AGC controller 121, and a DGEQ controller 122. The optical amplification apparatus illustrated in FIG. 19 corresponds to, for example, the postamplifier 13, the in-line amplifiers 21 through 23, and the preamplifier 31 illustrated in FIG. 2.

An optical signal to be amplified is inputted to the isolator 101. The isolator 101 prevents the optical signal from flowing back to the input side.

The BS 102 makes the optical signal outputted from the isolator 101 branch, and outputs it to the PD 103 and the coupler 105.

The PD 103 monitors optical power of the optical signal outputted from the BS 102. The monitored optical power is outputted to the AGC controller 121.

The LD 104 outputs an excitation light to the coupler 105 under the control of the AGC controller 121.

The coupler 105 combines the optical signal outputted from the BS 102 and the excitation light outputted from the LD 104. The coupler 105 is, for example, a WDM coupler.

The EDF 106 amplifies an optical signal outputted from the coupler 105. The EDF 106 amplifies an optical signal by the excitation light which is outputted from the LD 104 and which is combined with the optical signal outputted from the BS 102 by the coupler 105.

The isolator 107 prevents the optical signal from flowing back to the EDF 106 side.

The GEQ 108 equalizes optical signal gain. That is to say, the GEQ 108 makes output gain of the optical amplification apparatus (gain for output from the BS 119) flat with respect to wavelengths. The GEQ 108 is made of, for example, a dielectric multilayer film and has a fixed loss-wavelength characteristic.

The BS 109 makes the optical signal outputted from the GEQ 108 branch, and outputs it to the OCM 110 and the DGEQ 111.

The OCM 110 monitors optical power of the optical signal outputted from the BS 109 according to wavelengths. The monitored optical power is outputted to the DGEQ controller 122. With wavelengths where there is no signal, the OCM 110 may monitor, for example, an ASE generated in the EDF 106.

The DGEQ 111 can change loss of the optical signal according to wavelengths under the control of the DGEQ controller 122. The DGEQ 111 is the same as the DGEQ 51 described in FIGS. 3, 8, 10, 12, and 14.

The BS 112 makes the optical signal outputted from the DGEQ 111 branch, and outputs it to the OCM 113 and the isolator 114.

The OCM 113 monitors optical power of the optical signal outputted from the BS 112 according to wavelengths. The monitored optical power is outputted to the DGEQ controller 122.

The isolator 114 prevents the optical signal from flowing back to the EDF 106 side.

The LD 115 outputs an excitation light to the coupler 116 under the control of the AGC controller 121.

The coupler 116 combines the optical signal outputted from the isolator 114 and the excitation light outputted from the LD 115. The coupler 116 is, for example, a WDM coupler.

The EDF 117 amplifies an optical signal outputted from the coupler 116. The EDF 117 amplifies an optical signal by the excitation light which is outputted from the LD 115 and which is combined with the optical signal outputted from the isolator 114 by the coupler 116.

The isolator 118 prevents the optical signal from flowing back to the EDF 117 side.

The BS 119 makes the optical signal outputted from the isolator 118 branch, and outputs it to the PD 120 and a transmission line (not illustrated).

The PD 120 monitors optical power of the optical signal outputted from the BS 119. The monitored optical power is outputted to the AGC controller 121.

On the basis of the optical power of the optical signal monitored by the PD 103 and the optical power of the optical signal monitored by the PD 120, the AGC controller 121 controls power of an excitation light outputted from the LD 104 and an excitation light outputted from the LD 115 so as to keep the gain of the EDFs 106 and 117 (gain is the ratio of output from the EDF 117 to input to the EDF 106) constant at set gain. For example, the gain of the EDFs 106 and 117 can be calculated on the basis of the optical power of the optical signal monitored by the PD 103 and the optical power of the optical signal monitored by the PD 120. The AGC controller 121 controls power of an excitation light outputted from the LD 104 and an excitation light outputted from the LD 115 so as to keep the gain of the EDFs 106 and 117 calculated constant at the set gain.

The DGEQ controller 122 controls the DGEQ 111 so that it will have a loss-wavelength characteristic corresponding to a gain tilt of the EDF 106 which occurs according to the set gain and a gain tilt of the EDF 117 which occurs according to the set gain. This loss-wavelength characteristic cancels the gain tilt of the EDF 106 which occurs according to the set gain and the gain tilt of the EDF 117 which occurs according to the set gain. That is to say, this loss-wavelength characteristic makes output gain of the optical amplification apparatus flat with respect to wavelengths at the set gain of the EDFs 106 and 117.

The control by the DGEQ controller 122 is the same as the control by the DGEQ controller 57 described in the second embodiment. Furthermore, for example, gain tilts per unit of both of the EDFs 106 and 117 (for input to the EDF 106 and output from the EDF 117) are stored in a memory (not illustrated in FIG. 19). Alternatively, for example, loss-wavelength characteristics of both of the EDFs 106 and 117 corresponding to Gset are calculated in advance and are stored in a memory (not illustrated in FIG. 19).

As has been described, even if the optical amplification apparatus includes the two EDFs 106 and 117, the optical amplification apparatus can make its gain flat with respect to wavelengths according to gain of the EDFs 106 and 117 set.

A fourth embodiment will now be described in detail with reference to the drawing. The optical amplification apparatus according to the third embodiment includes the two EDFs and exercises AGC control over them. An optical amplification apparatus according to a fourth embodiment includes two EDFs and independently exercises AGC control over them.

Figure 20:
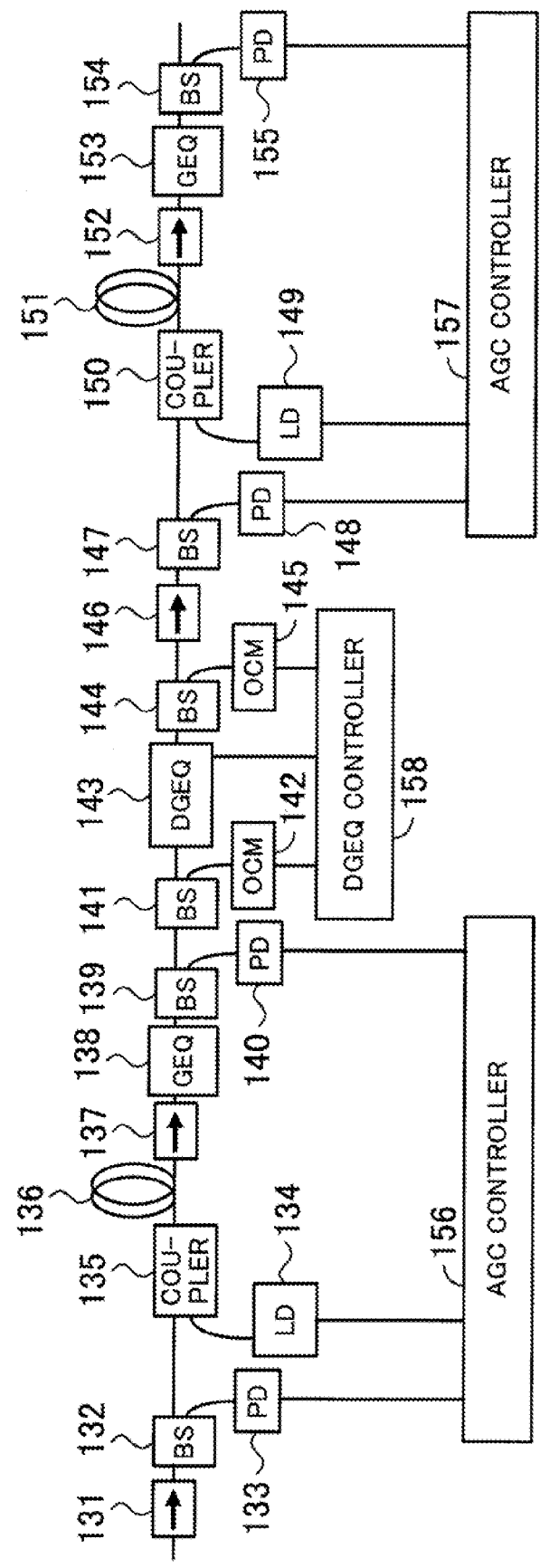
FIG. 20 illustrates an example of an optical transmission system to which an optical amplification apparatus according to a fourth embodiment is applied.

FIG. 20 illustrates an example of an optical transmission system to which an optical amplification apparatus according to a fourth embodiment is applied. As illustrated in FIG. 20, an optical amplification apparatus includes isolators 131, 137, 146, and 152, BSes 132, 139, 141, 144, 147, and 154, PDs 133, 140, 148, and 155, LDs 134 and 149, couplers 135 and 150, EDFs 136 and 151, GEQs 138 and 153, OCMs 142 and 145, a DGEQ 143, AGC controllers 156 and 157, and a DGEQ controller 158.

An optical signal to be amplified is inputted to the isolator 131. The isolator 131 prevents the optical signal from flowing back to the input side.

The BS 132 makes the optical signal outputted from the isolator 131 branch, and outputs it to the PD 133 and the coupler 135.

The PD 133 monitors optical power of the optical signal outputted from the BS 132. The monitored optical power is outputted to the AGC controller 156.

The LD 134 outputs an excitation light to the coupler 135 under the control of the AGC controller 156.

The coupler 135 combines the optical signal outputted from the BS 132 and the excitation light outputted from the LD 134. The coupler 135 is, for example, a WDM coupler.

The EDF 136 amplifies the optical signal outputted from the coupler 135. The EDF 136 amplifies the optical signal by the excitation light which is outputted from the LD 134 and which is combined with the optical signal outputted from the BS 132 by the coupler 135.

The isolator 137 prevents the optical signal from flowing back to the EDF 136 side.

The GEQ 138 equalizes optical signal gain. That is to say, the GEQ 138 makes gain for output from the BS 139 flat with respect to wavelengths. The GEQ 138 is made of, for example, a dielectric multilayer film and has a fixed loss-wavelength characteristic.

The BS 139 makes the optical signal outputted from the GEQ 138 branch, and outputs it to the PD 140 and the BS 141.

The PD 140 monitors optical power of the optical signal outputted from the BS 139. The monitored optical power is outputted to the AGC controller 156.

The BS 141 makes the optical signal outputted from the BS 139 branch, and outputs it to the OCM 142 and the DGEQ 143.

The OCM 142 monitors optical power of the optical signal outputted from the BS 141 according to wavelengths. The monitored optical power is outputted to the DGEQ controller 158. With wavelengths where there is no signal, the OCM 142 may monitor, for example, an ASE generated in the EDF 136.

The DGEQ 143 can change loss of the optical signal according to wavelengths under the control of the DGEQ controller 158. The DGEQ 143 is the same as the DGEQ 51 described in FIGS. 3, 8, 10, 12, and 14.

The BS 144 makes the optical signal outputted from the DGEQ 143 branch, and outputs it to the OCM 145 and the isolator 146.

The OCM 145 monitors optical power of the optical signal outputted from the BS 144 according to wavelengths. The monitored optical power is outputted to the DGEQ controller 158.

The isolator 146 prevents the optical signal from flowing back to the DGEQ 143 side.

The BSes 147 and 154 are the same as the BSes 132 and 139 respectively. The PDs 148 and 155 are the same as the PDs 133 and 140 respectively. The LD 149 is the same as the LD 134. The coupler 150 is the same as the coupler 135. The EDF 151 is the same as the EDF 136. The isolator 152 is the same as the isolator 137. The GEQ 153 is the same as the GEQ 138. Accordingly, descriptions of them will be omitted.

On the basis of the optical power of the optical signal monitored by the PD 133 and the optical power of the optical signal monitored by the PD 140, the AGC controller 156 controls power of an excitation light outputted from the LD 134 so as to keep the gain of the EDF 136 constant at set gain. For example, the gain of the EDF 136 can be calculated on the basis of the optical power of the optical signal monitored by the PD 133 and the optical power of the optical signal monitored by the PD 140. The AGC controller 156 controls power of an excitation light outputted from the LD 134 so as to keep the gain of the EDF 136 calculated constant at the set gain.

On the basis of optical power of an optical signal monitored by the PD 148 and optical power of an optical signal monitored by the PD 155, the AGC controller 157 controls power of an excitation light outputted from the LD 149 so as to keep the gain of the EDF 151 constant at set gain. For example, the gain of the EDF 151 can be calculated on the basis of optical power of an optical signal monitored by the PD 148 and optical power of an optical signal monitored by the PD 155. The AGC controller 157 controls power of an excitation light outputted from the LD 149 so as to keep the gain of the EDF 151 calculated constant at the set gain.

The DGEQ controller 158 controls the DGEQ 143 so that it will have a loss-wavelength characteristic corresponding to a gain tilt of the EDF 136 which occurs according to the set gain and a gain tilt of the EDF 151 which occurs according to the set gain. This loss-wavelength characteristic cancels the gain tilt of the EDF 136 which occurs according to the set gain and the gain tilt of the EDF 151 which occurs according to the set gain. That is to say, the DGEQ controller 158 controls the DGEQ 143 so as to make the gain of the EDFs 136 and 151 flat with respect to wavelengths.

The loss-wavelength characteristic is given by expression (4) described above. "Gset" in expression (4) is given by $$Gset = Gset1 + Gset2 \tag{10}$$

where Gset1 is gain of the EDF 136 set by the AGC controller 156 and Gset2 is gain of the EDF 151 set by the AGC controller 157. Furthermore, a gain tilt per unit of the EDF 136 is equal to a gain tilt per unit of the EDF 151. A gain tilt per unit of, for example, one of the EDFs 136 and 151 is stored in a memory (not illustrated). Alternatively, a loss-wavelength characteristic of, for example, one of the EDFs 136 and 151 corresponding to Gset is calculated in advance and is stored in a memory (not illustrated).

As has been described, the optical amplification apparatus includes the two EDFs 136 and 151. Even if the optical amplification apparatus independently sets gain of the EDFs 136 and 151, the optical amplification apparatus can make its gain flat with respect to wavelengths.

A fifth embodiment will now be described in detail with reference to the drawing. An optical amplification apparatus according to a fifth embodiment exercises ALC (Automatic Level Control) in addition to AGC control and DGEQ control.

Figure 21:
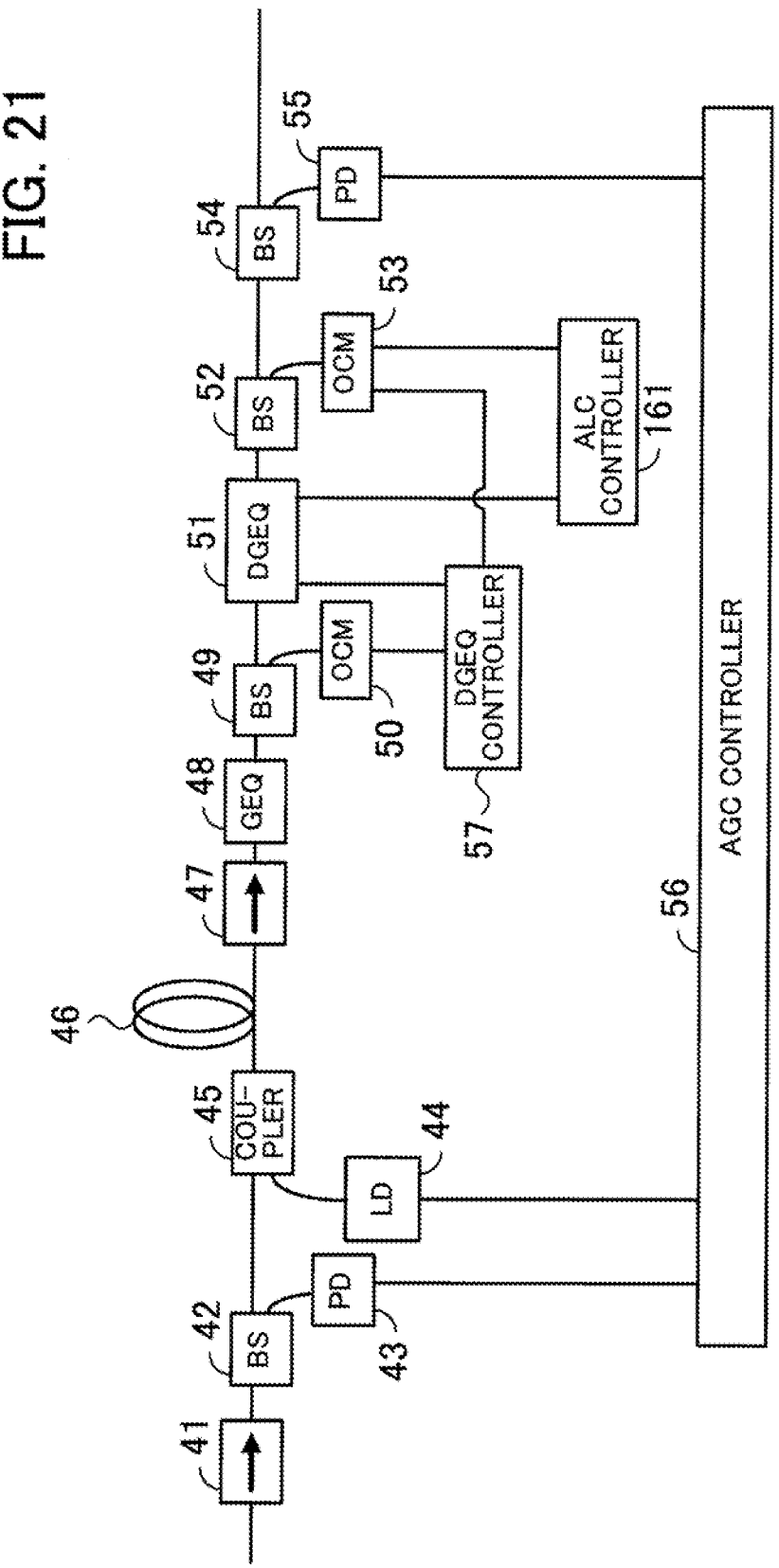
FIG. 21 illustrates an example of an optical transmission system to which an optical amplification apparatus according to a fifth embodiment is applied.

FIG. 21 illustrates an example of an optical transmission system to which an optical amplification apparatus according to a fifth embodiment is applied. Components in FIG. 21 which are the same as those illustrated in FIG. 3 are marked with the same symbols and descriptions of them will be omitted. An optical amplification apparatus illustrated in FIG. 21 includes an ALC controller 161.

The ALC controller 161 controls a DGEQ 51 so that a wavelength characteristic of optical power outputted from the DGEQ 51 will be a target wavelength characteristic. For example, electric circuits in a processor are used as the ALC controller 161. Deviation (output deviation ΔPout) between a wavelength characteristic of optical power outputted from the DGEQ 51 and a target wavelength characteristic is given by $$\Delta Pout(\lambda) = OCM2(\lambda) - Pout\_set(\lambda) \tag{11}$$

where OCM2(λ) is a wavelength characteristic (hereinafter this will also be referred to as an output wavelength characteristic) of optical power monitored by an OCM 53 and Pout_set(λ) is a target output wavelength characteristic.

The ALC controller 161 controls a loss-wavelength characteristic of the DGEQ 51 so as to make "ΔPout(λ)" in expression (11) small. For example, the ALC controller 161 calculates a loss-wavelength characteristic by the following expression (12) and controls the DGEQ 51.

$$Loss(\lambda, Gset) = Loss\_mon(\lambda) + \Delta Pout(\lambda) \tag{12}$$

"Loss_mon(λ)" can be calculated by expression (8) or expression (4) may be used instead.

Figure 22:
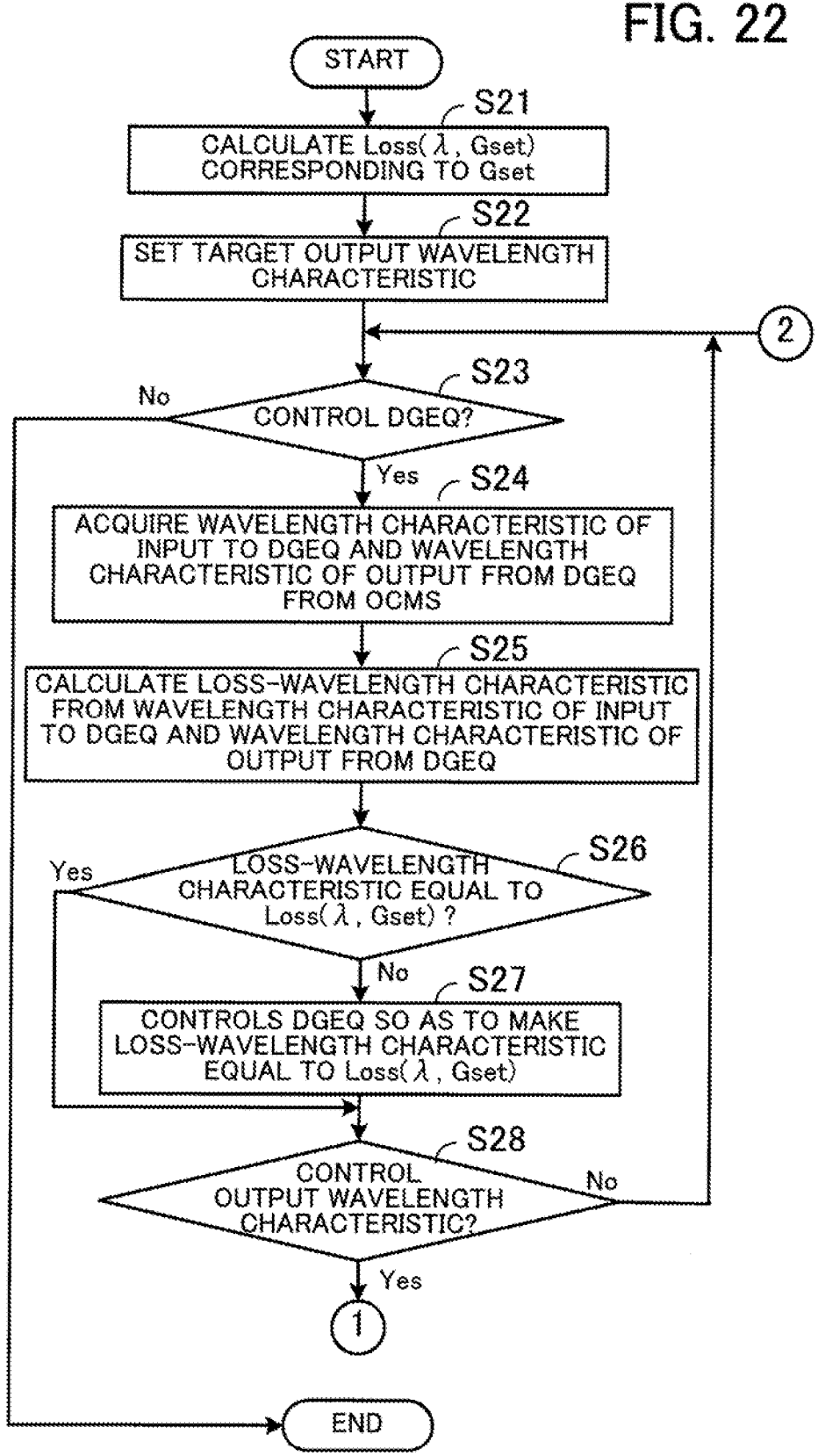
FIG. 22 is a flow chart of an example of the operation of a DGEQ controller and an ALC controller.
Figure 23:
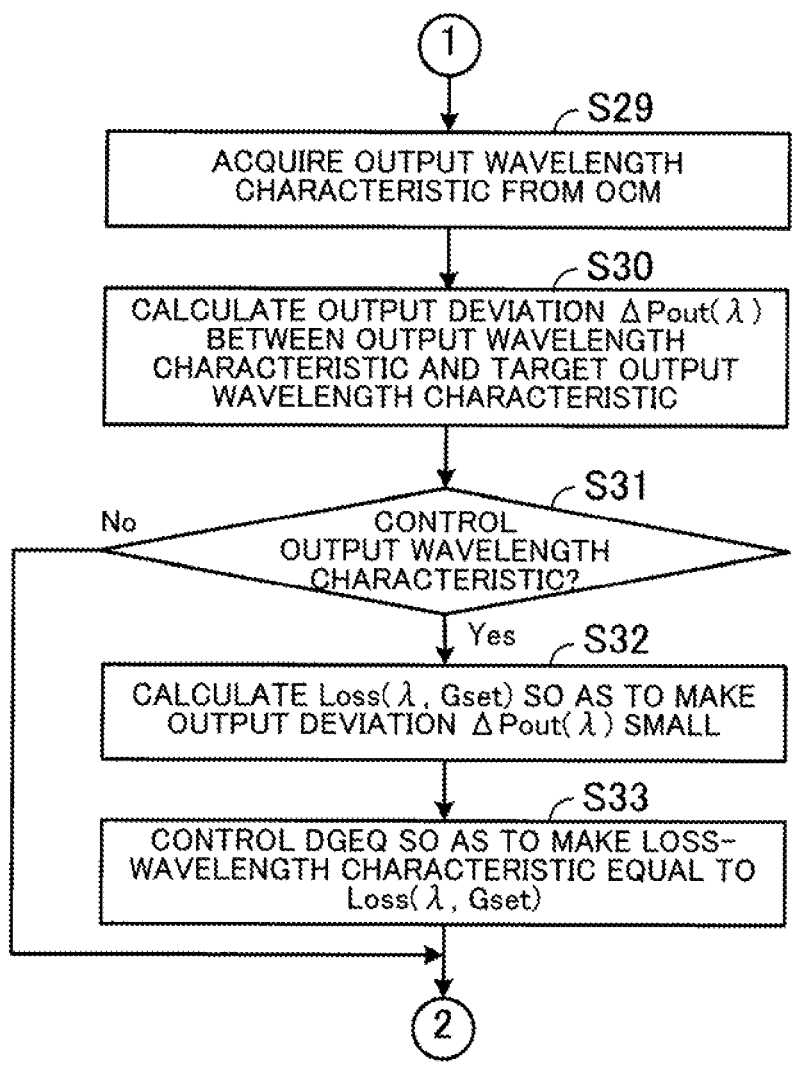
FIG. 23 is a flow chart of an example of the operation of the DGEQ controller and the ALC controller.

FIGS. 22 and 23 are flow charts of an example of the operation of a DGEQ controller and the ALC controller.

(S21) Operation S21 is the same as operation S11 described in FIG. 17 and its description will be omitted.

(S22) The ALC controller 161 sets a target output wavelength characteristic of optical power outputted from the optical amplification apparatus.

(S23 through S27) Operations S23 through S27 are the same as operations S12 through S16, respectively, described in FIG. 17 and their descriptions will be omitted. However, if a loss-wavelength characteristic of the DGEQ 51 is equal to Loss(λ, Gset) in operation S26, then operation S28 is performed.

(S28) The ALC controller 161 determines whether to exercise control so as to make an output wavelength characteristic of the OCM 53 equal to the target output wavelength characteristic. For example, the ALC controller 161 determines whether or not now is the timing at which the ALC controller exercises control so as to make an output wavelength characteristic of the DGEQ 51 equal to the target output wavelength characteristic. If the ALC controller 161 determines that the ALC controller 161 exercises control so as to make an output wavelength characteristic of the DGEQ 51 equal to the target output wavelength characteristic, then the ALC controller 161 proceeds to operation S29 indicated in FIG. 23. If the ALC controller 161 determines that the ALC controller 161 does not exercise control so as not to make an output wavelength characteristic of the DGEQ 51 equal to the target output wavelength characteristic, then operation S23 is performed.

(S29) The ALC controller 161 acquires an output wavelength characteristic of an optical signal monitored by the OCM 53.

(S30) The ALC controller 161 calculates output deviation ΔPout between the output wavelength characteristic acquired in operation S29 and the target output wavelength characteristic set in operation S22. For example, the ALC controller 161 calculates output deviation ΔPout by expression (11).

(S31) The ALC controller 161 determines whether to control the output wavelength characteristic of the DGEQ 51. For example, the ALC controller 161 determines whether or not the absolute value of the output deviation is greater than or equal to a determined value (including 0). If the ALC controller 161 determines that it controls the output wavelength characteristic of the DGEQ 51, then the ALC controller 161 proceeds to operation S32. If the ALC controller 161 determines that it does not control the output wavelength characteristic of the DGEQ 51, then operation S23 indicated in FIG. 22 is performed.

(S32) The ALC controller 161 calculates a loss-wavelength characteristic of the DGEQ 51 so as to make the output deviation ΔPout small. For example, the ALC controller 161 calculates a loss-wavelength characteristic by expression (11).

(S33) The ALC controller 161 controls the DGEQ 51 so as to make a loss-wavelength characteristic of the DGEQ 51 equal to the loss-wavelength characteristic calculated in operation S32. After that, operation S23 indicated in FIG. 22 is performed.

AGC control by the optical amplification apparatus illustrated in FIG. 21 is the same as the operation described in FIG. 16. Furthermore, the process described in FIG. 16 and the process described in FIGS. 22 and 23 are performed in parallel. Usually the speed of the AGC control is higher than the speed of the DGEQ control. If the speeds of monitoring by an OCM 50 and the OCM 53 and the speed of the DGEQ control can be made higher than the speed of the AGC control, then the speed of the DGEQ control may be made higher than the speed of the AGC control.

As has been described, the optical amplification apparatus can make its gain flat with respect to wavelengths according to gain of an EDF 46 set and exercise ALC control.

In addition, by exercising ALC control, gain deviation caused by, for example, an error in manufacturing the EDF 46 or a GEQ 48 can be compensated for.

Figure 24:
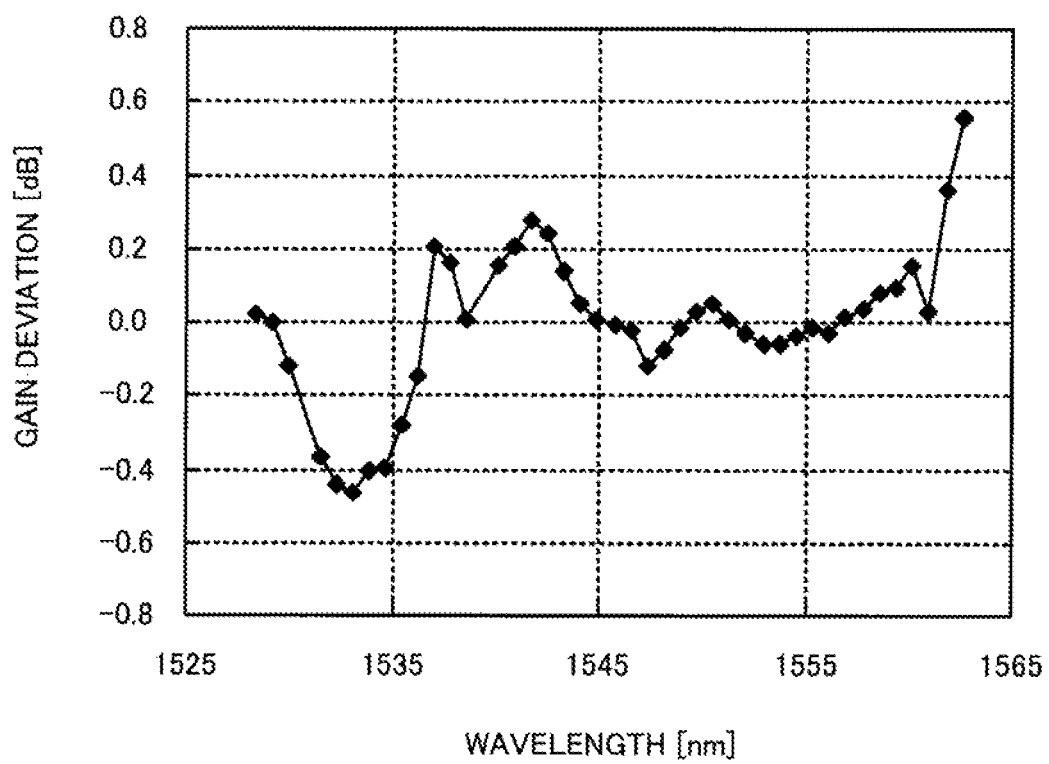
FIG. 24 is an example of gain deviation.

FIG. 24 is an example of gain deviation. In FIG. 24, a horizontal axis indicates a wavelength and a vertical axis indicates gain deviation of both or one of the EDF 46 and the GEQ 48.

As indicated in FIG. 24, a gain deviation of about 1 dB, for example, is caused in output from the GEQ 48 by variation at the time of manufacturing the EDF 46 or the GEQ 48. In this case, gain of the optical amplification apparatus is not flat with respect to wavelengths. With a long-distance large-capacity transmission system using in-line amplifiers for multistage relay, for example, such gain deviation is accumulated and transmission quality deteriorates. With the optical amplification apparatus illustrated in FIG. 21, however, the ALC controller 161 exercises ALC control so as to make an output wavelength characteristic of the OCM 53 equal to a target output wavelength characteristic. Therefore, gain deviation can be compensated for.

In addition, With this optical amplification apparatus the ALC controller 161 can also compensate for a wavelength characteristic which results from SRS in a transmission line or a wavelength characteristic of an optical device used in a WDM transmission system.

A sixth embodiment will now be described in detail with reference to the drawing. In a sixth embodiment the optical amplification apparatus according to the fifth embodiment includes two EDFs and can set high gain.

Figure 25:
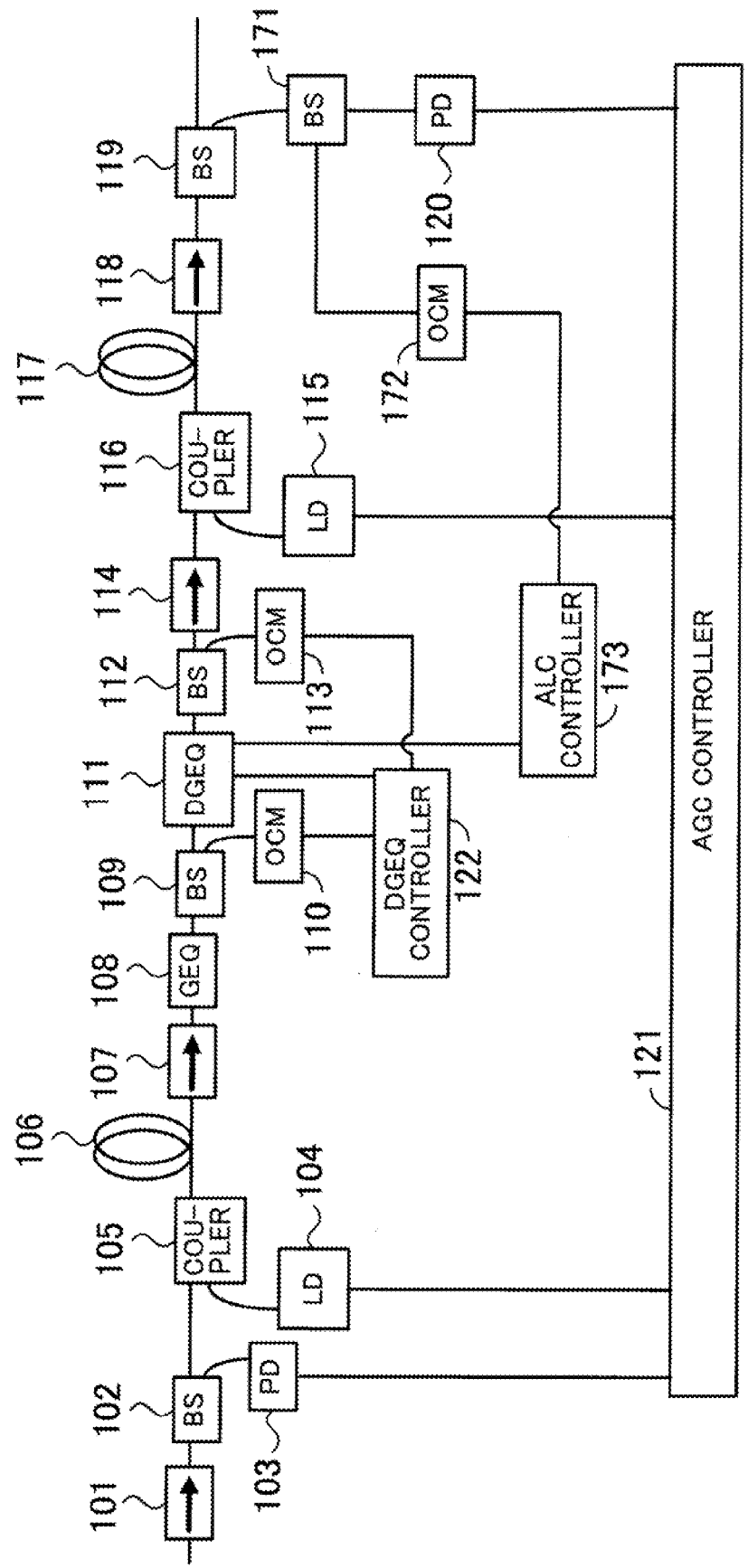
FIG. 25 illustrates an example of an optical transmission system to which an optical amplification apparatus according to a sixth embodiment is applied.

FIG. 25 illustrates an example of an optical transmission system to which an optical amplification apparatus according to a sixth embodiment is applied. Components in FIG. 25 which are the same as those illustrated in FIG. 19 are marked with the same symbols and descriptions of them will be omitted. An optical amplification apparatus illustrated in FIG. 25 includes a BS 171, an OCM 172, and an ALC controller 173.

The BS 171 outputs a part of an optical signal outputted from a BS 119 to the OCM 172.

The OCM 172 monitors optical power of the optical signal outputted from the BS 171 according to wavelengths. The monitored optical power is outputted to the ALC controller 173.

The ALC controller 173 has a function which is the same as that of the ALC controller 161 described in FIG. 21. The ALC controller 173 exercises control so that optical power of output from an EDF 117 will have a set target output wavelength characteristic.

As has been described, the optical amplification apparatus includes the two EDFs 106 and 117. The optical amplification apparatus can make its gain flat with respect to wavelengths according to gain of the EDFs 106 and 117 set, and exercise ALC control.

A seventh embodiment will now be described in detail with reference to the drawing. The optical amplification apparatus according to the sixth embodiment includes the two EDFs and exercises AGC control over them. An optical amplification apparatus according to a seventh embodiment includes two EDFs and independently exercises AGC control over them.

Figure 26:
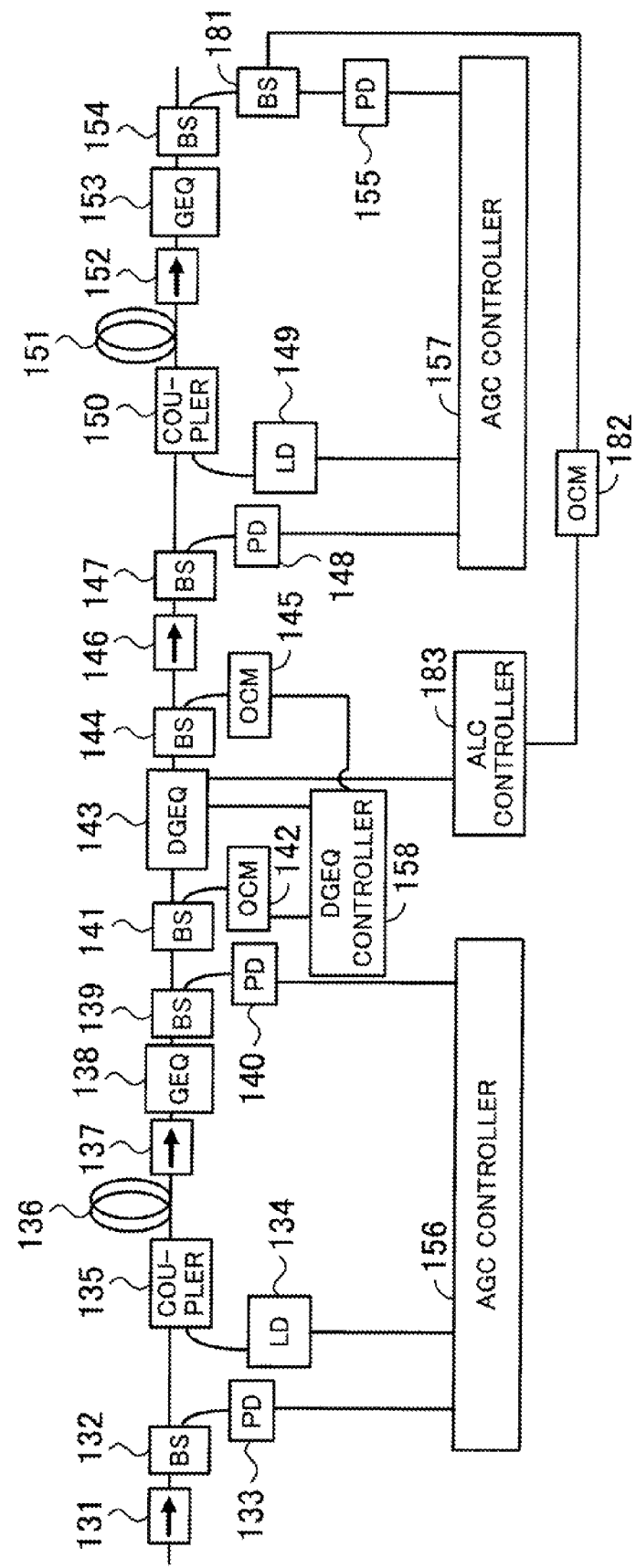
FIG. 26 illustrates an example of an optical transmission system to which an optical amplification apparatus according to a seventh embodiment is applied.

FIG. 26 illustrates an example of an optical transmission system to which an optical amplification apparatus according to a seventh embodiment is applied. Components in FIG. 26 which are the same as those illustrated in FIG. 20 are marked with the same symbols and descriptions of them will be omitted. An optical amplification apparatus illustrated in FIG. 26 includes a BS 181, an OCM 182, and an ALC controller 183.

The BS 181 outputs a part of an optical signal outputted from a BS 154 to the OCM 182.

The OCM 182 monitors optical power of the optical signal outputted from the BS 181 according to wavelengths. The monitored optical power is outputted to the ALC controller 183.

The ALC controller 183 has a function which is the same as that of the ALC controller 161 described in FIG. 21. The ALC controller 183 exercises control so that optical power of output from an EDF 151 will have a set target output wavelength characteristic.

As has been described, the optical amplification apparatus includes the two EDFs 136 and 151. Even if the optical amplification apparatus independently sets gain of the EDFs 136 and 151, the optical amplification apparatus can make its gain flat with respect to wavelengths and exercise ALC control.

The disclosed optical amplification apparatus can make its gain flat with respect to wavelengths according to gain of the optical amplifier set.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An optical amplification apparatus comprising:
    a first detector which detects total power of wavelength-multiplexed light received;
    an optical amplifier which amplifies the wavelength-multiplexed light at a set gain;
    an attenuator which attenuates power of each wavelength according to the set gain;
    a second detector which detects total power of wavelength-multiplexed light whose wavelengths each have the attenuated power;
    a third detector which detects optical power of the optical signal outputted from the optical amplifier according to wavelengths; and
    a fourth detector which detects optical power of the optical signal outputted from the attenuator according to wavelengths,
    wherein the optical amplifier amplifies the wavelength-multiplexed light so as to obtain the set gain, on the basis of detection results obtained by the first detector and the second detector; and
    wherein the attenuator attenuates power of each wavelength on the basis of detection results obtained by the third detector and the fourth detector.

2. The optical amplification apparatus according to claim 1 further comprising a fixed attenuator which varies loss of the wavelength-multiplexed light on the basis of a gain tilt according to a determined gain,
    wherein the attenuator attenuates the power of said each wavelength on the basis of the determined gain and the set gain.

3. The optical amplification apparatus according to claim 1, wherein the attenuator is placed between two optical amplifiers.

4. The optical amplification apparatus according to claim 1, wherein the attenuator causes different loss for said each wavelength so as to reduce a gain tilt according to the set gain.

5. The optical amplification apparatus according to claim 1,
    wherein the second detector detects optical power of noise by using wavelength light other than signal light out of output light output from the optical amplifier.

6. The optical amplification apparatus according to claim 1, wherein the attenuator further includes Digital Micro mirror Device (DMD), and causes different loss for each wavelength of the wavelength-multiplexed light by varying an angle of the mirror of the DMD.

7. The optical amplification apparatus according to claim 1, wherein the attenuator further includes Liquid Crystal On Silicon (LCOS) that varies phase of each wavelength of the wavelength-multiplexed light.

8. The optical amplification apparatus according to claim 1, wherein the attenuator further includes Liquid Crystal On Silicon (LCOS) that varies a phase of each wavelength of the wavelength-multiplexed light.

9. An optical transmission apparatus comprising:
    a receiver which receives wavelength-multiplexed light;
    a first detector which detects total power of the received wavelength-multiplexed light;
    an optical amplifier which amplifies the wavelength-multiplexed light at a set gain;
    an attenuator which attenuates power of each wavelength according to the set gain;
    a second detector which detects total power of wavelength-multiplexed light whose wavelengths each have the attenuated power;
    a third detector which detects optical power of the optical signal outputted from the optical amplifier according to wavelengths;
    a fourth detector which detects optical power of the optical signal outputted from the attenuator according to wavelengths; and
    a transmitter which transmits the amplified wavelength-multiplexed light,
    wherein the optical amplifier amplifies the wavelength-multiplexed light so as to obtain the set gain, on the basis of detection results obtained by the first detector and the second detector; and
    wherein the attenuator attenuates power of each wavelength on the basis of detection results obtained by the third detector and the fourth detector.

* * * * *